US012683718B2

(12) United States Patent
Bar-Or Tillinger et al.

(10) Patent No.: US 12,683,718 B2
(45) Date of Patent: Jul. 14, 2026

(54) RETRANSMISSION BANDWIDTH REDUCTION

(71) Applicant: QUALCOMM Incorporated, San Diego, CA (US)

(72) Inventors: Amit Bar-Or Tillinger, Tel-Aviv (IL); Shay Landis, Hod Hasharon (IL); Idan Michael Horn, Hod Hasharon (IL)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 17/942,925

(22) Filed: Sep. 12, 2022

(65) Prior Publication Data

US 2024/0089035 A1     Mar. 14, 2024

(51) Int. Cl.
| | |
|---|---|
| *H04L 1/1825* | (2023.01) |
| *H04L 5/00* | (2006.01) |
| *H04W 28/06* | (2009.01) |
| *H04W 72/50* | (2023.01) |

(52) U.S. Cl.
CPC .......... *H04L 1/1825* (2013.01); *H04L 5/0055* (2013.01); *H04W 28/06* (2013.01); *H04W 72/535* (2023.01)

(58) Field of Classification Search
CPC ... H04L 1/1825; H04L 5/0055; H04L 1/0007; H04L 47/365; H04W 28/06; H04W 72/535
See application file for complete search history.

(56) References Cited

U.S. PATENT DOCUMENTS

| | | | | |
|---|---|---|---|---|
| 2017/0111145 A1* | 4/2017 | Höglund | ............... | H04L 1/1896 |
| 2019/0261394 A1* | 8/2019 | Li | ........................... | H04W 72/23 |
| 2020/0059345 A1* | 2/2020 | Pelletier | ................... | H04B 7/00 |
| 2020/0187293 A1* | 6/2020 | Kuang | .................. | H04L 5/0094 |
| 2020/0267597 A1* | 8/2020 | Huang | .................. | H04L 1/1812 |
| 2020/0374086 A1* | 11/2020 | Tang | ..................... | H04L 5/0055 |
| 2021/0227604 A1* | 7/2021 | Huang | ............... | H04W 40/248 |
| 2022/0052821 A1* | 2/2022 | Kim | .................. | H04W 72/0446 |
| 2022/0376827 A1* | 11/2022 | Seo | ........................ | H04L 1/1657 |
| 2025/0031272 A1* | 1/2025 | Zhang | .................. | H04W 76/27 |
| 2025/0048391 A1* | 2/2025 | Park | ...................... | H04W 72/25 |

FOREIGN PATENT DOCUMENTS

WO     WO-2019158021 A1 *  8/2019   ............ H04W 72/23

OTHER PUBLICATIONS

Machine translation of WO 2019-158021 (Year: 2019).*

* cited by examiner

*Primary Examiner* — Kevin T Bates
(74) *Attorney, Agent, or Firm* — Loza & Loza, LLP

(57)     ABSTRACT

Aspects relate to using a reduced bandwidth for a retransmission of a first transmission, where the bandwidth reduction is based on acknowledgement information associated with the first transmission. For example, the amount of the bandwidth reduction may be based on the number of positive acknowledgements and/or negative acknowledgements sent by a UE in response to the first transmission. In some examples, the reduction in bandwidth may be applicable to a control search space and/or a data resource allocation.

30 Claims, 15 Drawing Sheets

Control
Region 502

Coreset #N 3
2
1
0

504

.
.
.

Coreset #4

3
2
1
0

Coreset #3

3
2
1
0

Coreset #2

3
2
1
0

Coreset #1

3
2
1
0

1 Control Channel
Element (CCE) 506

1 Sub-carrier

.
.
.

1 Symbol

Frequency

Time

Control
Region  606

600

604

602

1 Sub-carrier

1 Symbol

Frequency

Time

Control Channel
Element (CCE) 600

Resource Element
Group (REG) 604

Resource Element
(RE) 602

800

802

Network Entity

804

User
Equipment

CORESET and SS configurations
806

810

Schedule PDSCH
transmission

808

Commence
monitoring search
space

DCI
812

PDSCH transmission
814

816

Decode DCI

818

Decode PDSCH

HARQ-Ack
820

1200

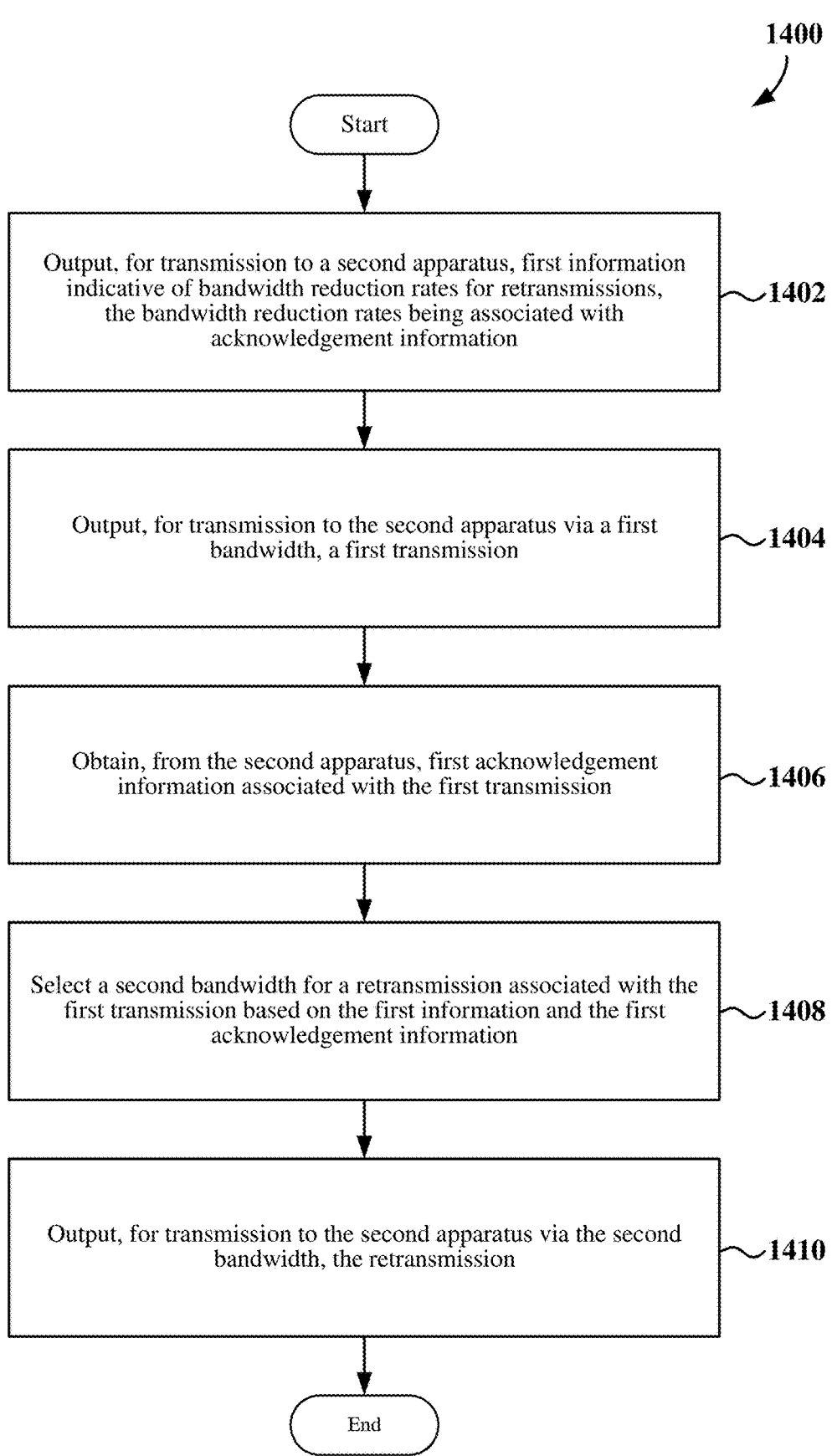

1400

Start

Output, for transmission to a second apparatus, first information indicative of bandwidth reduction rates for retransmissions, the bandwidth reduction rates being associated with acknowledgement information ～1402

Output, for transmission to the second apparatus via a first bandwidth, a first transmission ～1404

Obtain, from the second apparatus, first acknowledgement information associated with the first transmission ～1406

Select a second bandwidth for a retransmission associated with the first transmission based on the first information and the first acknowledgement information ～1408

Output, for transmission to the second apparatus via the second bandwidth, the retransmission ～1410

End

FIG. 14

RETRANSMISSION BANDWIDTH REDUCTION

The technology discussed below relates generally to wireless communication and, more particularly, to bandwidth reduction for a retransmission.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a first cell of a first base station (BS) such as a gNB and/or access a second cell of a second base station.

A base station may schedule access to a cell to support access by multiple UEs. For example, a base station may allocate different resources (e.g., time domain and frequency domain resources) to be used by different UEs operating within the cell. In some examples, the base station may send downlink control information to a UE that identifies the resources to be used for a downlink transmission to a UE or an uplink transmission from a UE, as well as other information that the UE can use to receive the downlink transmission or transmit the uplink transmission.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

In some examples, a first apparatus for wireless communication may include a processing system. The processing system may be configured to obtain, from a second apparatus, first information indicative of bandwidth reduction rates for retransmissions, the bandwidth reduction rates being associated with acknowledgement information. The processing system may be configured to obtain a first transmission from the second apparatus via a first bandwidth. The processing system may be configured to output, for transmission to the second apparatus, first acknowledgement information associated with the first transmission. The processing system may be configured to select a second bandwidth for a retransmission associated with the first transmission based on the first information and the first acknowledgement information. The processing system may be configured to monitor for the retransmission via the second bandwidth.

In some examples, a method for communication at a user equipment is disclosed. The method may include obtaining, from a second apparatus, first information indicative of bandwidth reduction rates for retransmissions, the bandwidth reduction rates being associated with acknowledgement information. The method may include obtaining a first transmission from the second apparatus via a first bandwidth. The method may include outputting, for transmission to the second apparatus, first acknowledgement information associated with the first transmission. The method may include selecting a second bandwidth for a retransmission associated with the first transmission based on the first information and the first acknowledgement information. The method may include monitoring for the retransmission via the second bandwidth.

In some examples, a first apparatus for communication may include means for obtaining, from a second apparatus, first information indicative of bandwidth reduction rates for retransmissions, the bandwidth reduction rates being associated with acknowledgement information. The first apparatus may include means for obtaining a first transmission from the second apparatus via a first bandwidth. The first apparatus may include means for outputting, for transmission to the second apparatus, first acknowledgement information associated with the first transmission. The first apparatus may include means for selecting a second bandwidth for a retransmission associated with the first transmission based on the first information and the first acknowledgement information. The first apparatus may include means for monitoring for the retransmission via the second bandwidth.

In some examples, a non-transitory computer-readable medium has stored therein instructions executable by a processing system of a first apparatus to obtain, from a second apparatus, first information indicative of bandwidth reduction rates for retransmissions, the bandwidth reduction rates being associated with acknowledgement information. The computer-readable medium may also have stored therein instructions executable by the processing system of the first apparatus to obtain a first transmission from the second apparatus via a first bandwidth. The computer-readable medium may also have stored therein instructions executable by the processing system of the first apparatus to output, for transmission to the second apparatus, first acknowledgement information associated with the first transmission. The computer-readable medium may also have stored therein instructions executable by the processing system of the first apparatus to select a second bandwidth for a retransmission associated with the first transmission based on the first information and the first acknowledgement information. The computer-readable medium may also have stored therein instructions executable by the processing system of the first apparatus to monitor for the retransmission via the second bandwidth.

In some examples, a first apparatus for wireless communication may include a processing system. The processing system may be configured to output, for transmission to a second apparatus, first information indicative of bandwidth reduction rates for retransmissions, the bandwidth reduction rates being associated with acknowledgement information. The processing system may be configured to output, for transmission to the second apparatus via a first bandwidth, a first transmission. The processing system may be configured to obtain, from the second apparatus, first acknowledgement information associated with the first transmission. The processing system may be configured to select a second bandwidth for a retransmission associated with the first transmission based on the first information and the first acknowledgement information. The processing system may be configured to output, for transmission to the second apparatus via the second bandwidth, the retransmission.

In some examples, a method for communication at a user equipment is disclosed. The method may include outputting, for transmission to a second apparatus, first information indicative of bandwidth reduction rates for retransmissions, the bandwidth reduction rates being associated with acknowledgement information. The method may include outputting, for transmission to the second apparatus via a first bandwidth, a first transmission. The method may include obtaining, from the second apparatus, first acknowledgement information associated with the first transmission. The method may include selecting a second bandwidth for a retransmission associated with the first transmission based on the first information and the first acknowledgement information. The method may include outputting, for transmission to the second apparatus via the second bandwidth, the retransmission.

In some examples, a first apparatus for communication may include means for outputting, for transmission to a second apparatus, first information indicative of bandwidth reduction rates for retransmissions, the bandwidth reduction rates being associated with acknowledgement information. The first apparatus may include means for outputting, for transmission to the second apparatus via a first bandwidth, a first transmission. The first apparatus may include means for obtaining, from the second apparatus, first acknowledgement information associated with the first transmission. The first apparatus may include means for selecting a second bandwidth for a retransmission associated with the first transmission based on the first information and the first acknowledgement information. The first apparatus may include means for outputting, for transmission to the second apparatus via the second bandwidth, the retransmission.

In some examples, a non-transitory computer-readable medium has stored therein instructions executable by a processing system of a first apparatus to output, for transmission to a second apparatus, first information indicative of bandwidth reduction rates for retransmissions, the bandwidth reduction rates being associated with acknowledgement information. The computer-readable medium may also have stored therein instructions executable by the processing system of the first apparatus to output, for transmission to the second apparatus via a first bandwidth, a first transmission. The computer-readable medium may also have stored therein instructions executable by the processing system of the first apparatus to obtain, from the second apparatus, first acknowledgement information associated with the first transmission. The computer-readable medium may also have stored therein instructions executable by the processing system of the first apparatus to select a second bandwidth for a retransmission associated with the first transmission based on the first information and the first acknowledgement information. The computer-readable medium may also have stored therein instructions executable by the processing system of the first apparatus to output, for transmission to the second apparatus via the second bandwidth, the retransmission.

In some examples, a user equipment includes a transceiver and a processing system. The transceiver may be configured to receive, from a second apparatus, first information indicative of bandwidth reduction rates for retransmissions, the bandwidth reduction rates being associated with acknowledgement information. The transceiver may be configured to receive a first transmission from the second apparatus via a first bandwidth. The transceiver may be configured to transmit, to the second apparatus, first acknowledgement information associated with the first transmission. The processing system may be configured to select a second bandwidth for a retransmission associated with the first transmission based on the first information and the first acknowledgement information, and monitor for the retransmission via the second bandwidth.

In some examples, a network entity includes a transceiver and a processing system. The transceiver may be configured to transmit, to a wireless node, first information indicative of bandwidth reduction rates for retransmissions, the bandwidth reduction rates being associated with acknowledgement information. The transceiver may be configured to transmit a first transmission to the wireless node via a first bandwidth. The transceiver may be configured to receive, from the wireless node, first acknowledgement information associated with the first transmission. The processing system may be configured to select a second bandwidth for a retransmission associated with the first transmission based on the first information and the first acknowledgement information, and monitor for the retransmission via the second bandwidth.

These and other aspects of the disclosure will become more fully understood upon a review of the detailed description, which follows. Other aspects, features, and examples of the present disclosure will become apparent to those of ordinary skill in the art, upon reviewing the following description of specific, example aspects of the present disclosure in conjunction with the accompanying figures. While features of the present disclosure may be discussed relative to certain examples and figures below, all examples of the present disclosure can include one or more of the advantageous features discussed herein. In other words, while one or more examples may be discussed as having certain advantageous features, one or more of such features may also be used in accordance with the various examples of the disclosure discussed herein. In similar fashion, while example aspects may be discussed below as device, system, or method examples it should be understood that such example aspects can be implemented in various devices, systems, and methods.

BRIEF DESCRIPTION OF THE DRAWINGS

FIG. 14 is a flow chart illustrating an example communication method involving information for a retransmission according to some aspects.

DETAILED DESCRIPTION

Figure 1:
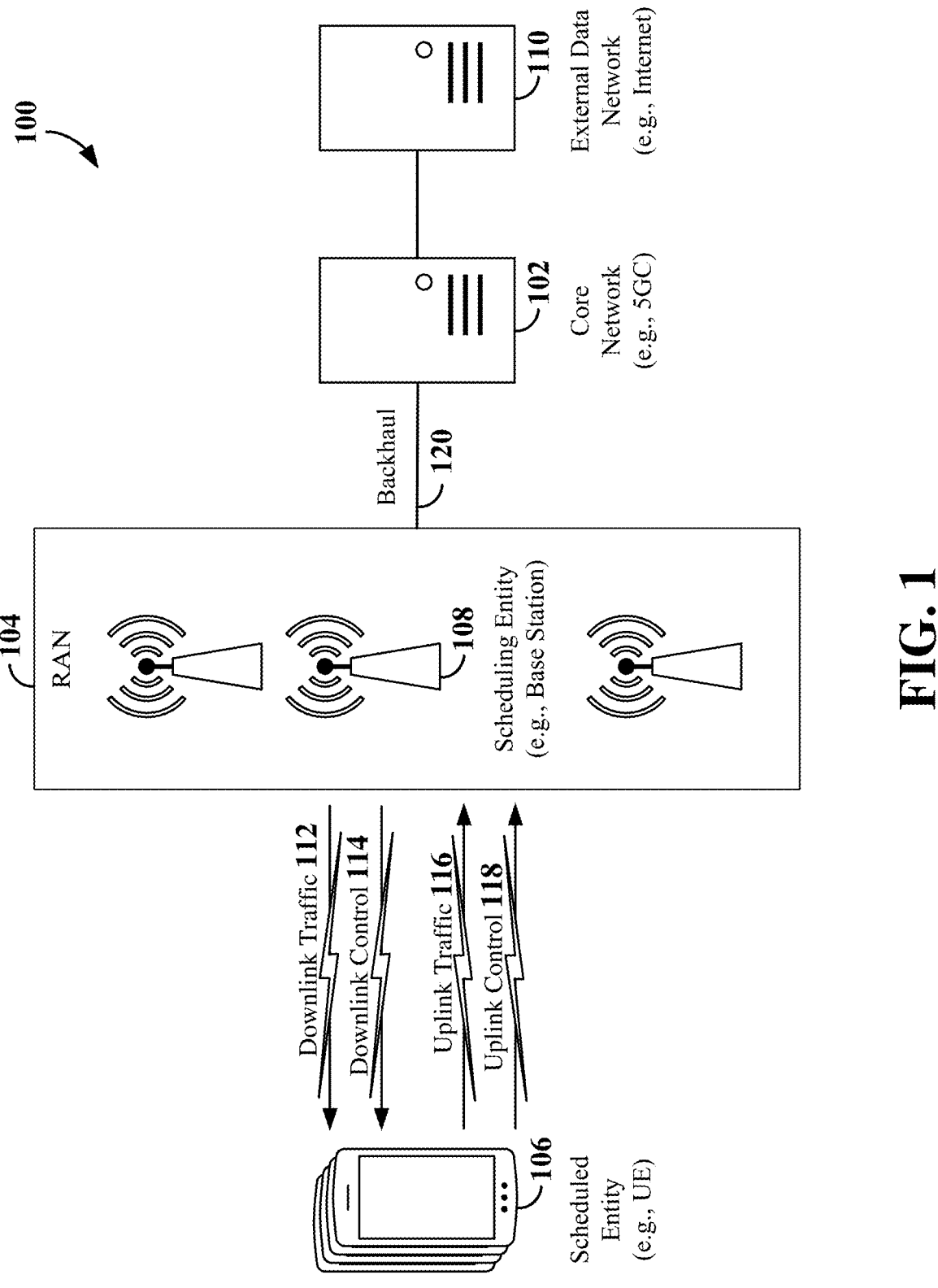
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

While aspects and examples are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, aspects and/or uses may come about via integrated chip examples and other non-module-component based devices (e.g., end-user devices, vehicles, communication devices, computing devices, industrial equipment, retail/purchasing devices, medical devices, artificial intelligence-enabled (AI-enabled) devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described examples. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, disaggregated arrangements (e.g., base station and/or UE), end-user devices, etc., of varying sizes, shapes, and constitution.

Various aspects of the disclosure relate to resources for retransmissions. A first apparatus may send a first transmission to a second apparatus. In the event the second apparatus does not successfully receive the first transmission, the second apparatus may send an indication of such (e.g., a NACK) to the first apparatus. Upon receiving this indication, the first apparatus may send a retransmission of the first transmission to the second apparatus. In various examples, the first transmission may be a physical downlink shared channel (PDSCH) transmission or some other type of transmission.

The disclosure relates in some aspects to using a reduced bandwidth for a retransmission of a first transmission, where the bandwidth reduction is based on acknowledgement information associated with the first transmission. For example, the amount of the bandwidth reduction may be based on the number of ACKs and/or NACKs sent by the second apparatus (e.g., a UE) in response to the first transmission. In some examples, the reduction in bandwidth may be applicable to a physical downlink control channel (PDCCH) search space and/or a PDSCH resource allocation.

In some examples, the first apparatus may use a first bandwidth for a first PDSCH transmission and a second bandwidth, different from the first bandwidth, for a retransmission of the first PDSCH transmission. For example, the first apparatus might only need to retransmit a portion of the first transmission. Thus, the first apparatus may use a smaller second bandwidth for the retransmission.

The disclosure relates in some aspects to using a dedicated control resource set search space for a retransmission. For example, the first apparatus may send control information for the first transmission via a first search. The second apparatus may therefore monitor the first search space to determine whether and/or how the first apparatus will be sending the first transmission. For the retransmission, however, the first apparatus may send control information for the retransmission via a second search space that is dedicated for retransmissions. The second apparatus may therefore monitor the second search space to determine whether and/or how the first apparatus will be sending the retransmission.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. In another example, the RAN 104 may operate according to both the LTE and 5G NR standards. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band. In examples where the RAN 104 operates according to both the LTE and 5G NR standards, one of the base stations 108 may be an LTE base station, while another base station may be a 5G NR base station.

The radio access network 104 is further illustrated supporting wireless communication for multiple mobile apparatuses. A mobile apparatus may be referred to as user equipment (UE) 106 in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE 106 may be an apparatus that provides a user with access to network services. In examples where the RAN 104 operates according to both the LTE and 5G NR standards, the UE 106 may be an Evolved-Universal Terrestrial Radio Access Network-New Radio dual connectivity (EN-DC) UE that is capable of simultaneously connecting to an LTE base station and an NR base station to receive data packets from both the LTE base station and the NR base station.

Within the present document, a mobile apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc., electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an Internet of Things (IoT).

A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc., an industrial automation and enterprise device, a logistics controller, agricultural equipment, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a base station (e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a UE (e.g., UE 106).

In some examples, access to the air interface may be scheduled, wherein a scheduling entity (e.g., a base station 108) of some other type of network entity allocates resources for communication among some or all devices and equipment within its service area or cell. Within the present disclosure, as discussed further below, the scheduling entity may be responsible for scheduling, assigning, reconfiguring, and releasing resources for one or more scheduled entities (e.g., UEs). That is, for scheduled communication, a plurality of UEs 106, which may be scheduled entities, may utilize resources allocated by a scheduling entity (e.g., a base station 108).

Base stations 108 are not the only entities that may function as scheduling entities. That is, in some examples, a UE may function as a scheduling entity, scheduling resources for one or more scheduled entities (e.g., one or more other UEs). For example, UEs may communicate with other UEs in a peer-to-peer or device-to-device fashion and/or in a relay configuration.

As illustrated in FIG. 1, a scheduling entity (e.g., a base station 108) may broadcast downlink traffic 112 to one or more scheduled entities (e.g., a UE 106). Broadly, the scheduling entity is a node or device responsible for scheduling traffic in a wireless communication network, including the downlink traffic 112 and, in some examples, uplink traffic 116 and/or uplink control information 118 from one or more scheduled entities to the scheduling entity. On the other hand, the scheduled entity is a node or device that receives downlink control information 114, including but not limited to scheduling information (e.g., a grant), synchronization or timing information, or other control information from another entity in the wireless communication network such as the scheduling entity.

In addition, the uplink control information 118, downlink control information 114, downlink traffic 112, and/or uplink traffic 116 may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Within the present disclosure, a frame may refer to a predetermined duration (e.g., 10 ms) for wireless transmissions, with each frame consisting of, for example, 10 subframes of 1 ms each. Of course, these definitions are not required, and any suitable scheme for organizing waveforms may be utilized, and various time divisions of the waveform may have any suitable duration.

In general, base stations 108 may include a backhaul interface for communication with a backhaul 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
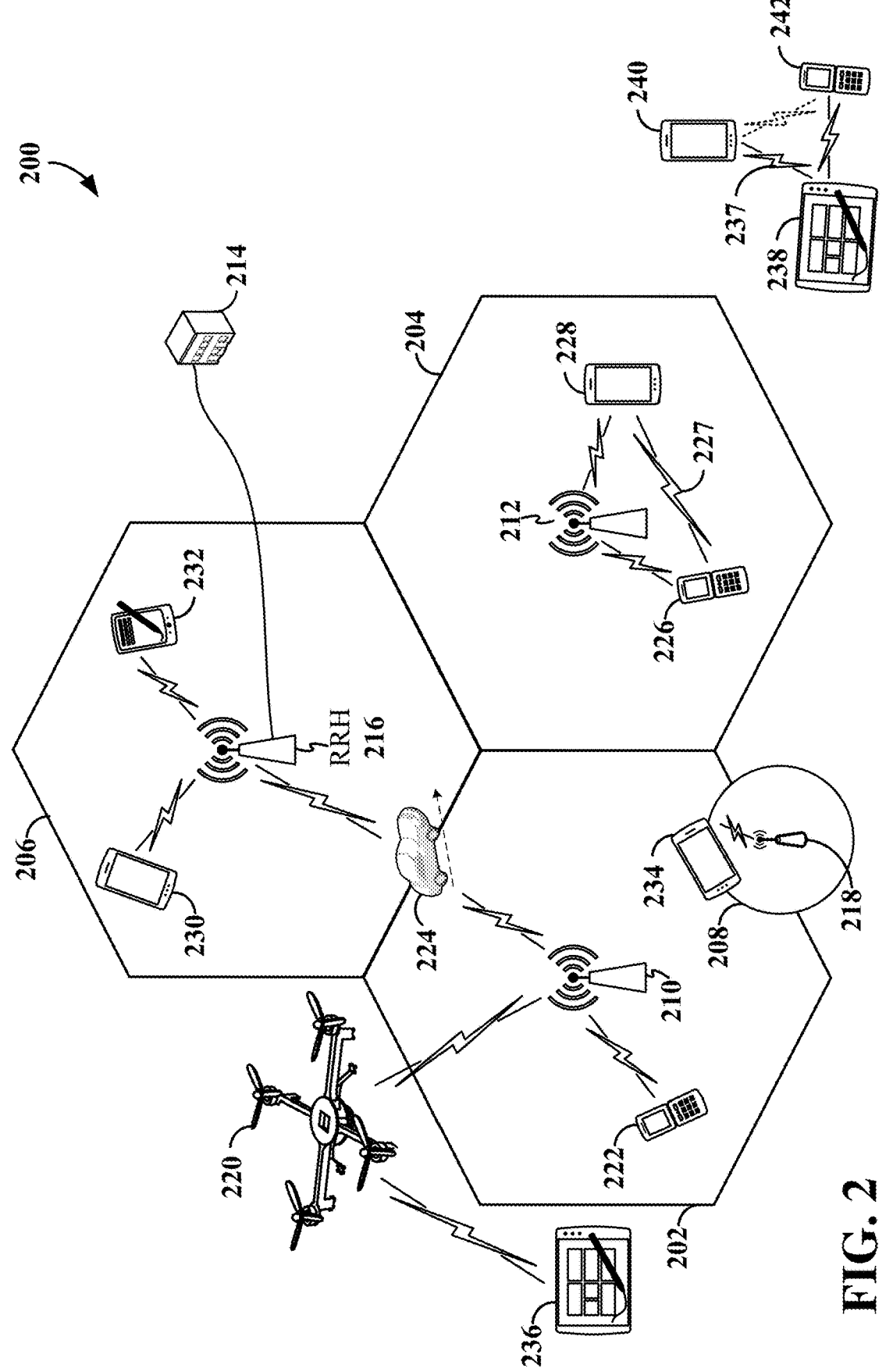
FIG. 2 is a conceptual illustration of an example of a radio access network according to some aspects.

Referring now to FIG. 2, by way of example and without limitation, a schematic illustration of a radio access network (RAN) 200 is provided. In some examples, the RAN 200 may be the same as the RAN 104 described above and illustrated in FIG. 1.

The geographic area covered by the RAN 200 may be divided into cellular regions (cells) that can be uniquely identified by a user equipment (UE) based on an identification broadcasted from one access point or base station. FIG. 2 illustrates cells 202, 204, 206, and 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the cell 208, which may overlap with one or more macrocells. In this example, the cell 208 may be referred to as a small cell (e.g., a microcell, picocell, femtocell, home base station, home Node B, home eNode B, etc.), as the base station 218 supports a cell having a relatively small size. Cell sizing can be done according to system design as well as component constraints.

It is to be understood that the RAN 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity described above and illustrated in FIG. 1.

FIG. 2 further includes an unmanned aerial vehicle (UAV) 220, which may be a drone or quadcopter. The UAV 220 may be configured to function as a base station, or more specifically as a mobile base station. That is, in some examples, a cell may not necessarily be stationary, and the geographic area of the cell may move according to the location of a mobile base station, such as the UAV 220.

Within the RAN 200, the cells may include UEs that may be in communication with one or more sectors of each cell. Further, each base station 210, 212, 214, and 218 may be configured to provide an access point to a core network 102 (see FIG. 1) for all the UEs in the respective cells. For example, UEs 222 and 224 may be in communication with base station 210; UEs 226 and 228 may be in communication with base station 212; UEs 230 and 232 may be in communication with base station 214 by way of RRH 216; and UE 234 may be in communication with base station 218. In some examples, the UEs 222, 224, 226, 228, 230, 232, 234, 236, 238, 240, and/or 242 may be the same as the UE/scheduled entity described above and illustrated in FIG. 1. In some examples, the UAV 220 (e.g., the quadcopter) can be a mobile network node and may be configured to function as a UE. For example, the UAV 220 may operate within cell 202 by communicating with base station 210.

In a further aspect of the RAN 200, sidelink signals may be used between UEs without necessarily relying on scheduling or control information from a base station. Sidelink communication may be utilized, for example, in a device-to-device (D2D) network, peer-to-peer (P2P) network, vehicle-to-vehicle (V2V) network, vehicle-to-everything (V2X) network, and/or other suitable sidelink network. For example, two or more UEs (e.g., UEs 238, 240, and 242) may communicate with each other using sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 212. In this example, the base station 212 may allocate resources to the UEs 226 and 228 for the sidelink communication.

In the RAN 200, the ability for a UE to communicate while moving, independent of its location, is referred to as mobility. The various physical channels between the UE and the radio access network are generally set up, maintained, and released under the control of an access and mobility management function (AMF, not illustrated, part of the core network 102 in FIG. 1), which may include a security context management function (SCMF) that manages the security context for both the control plane and the user plane functionality, and a security anchor function (SEAF) that performs authentication.

A RAN 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224

(illustrated as a vehicle, although any suitable form of UE may be used) may move from the geographic area corresponding to its serving cell (e.g., the cell 202) to the geographic area corresponding to a neighbor cell (e.g., the cell 206). When the signal strength or quality from the neighbor cell exceeds that of the serving cell for a given amount of time, the UE 224 may transmit a reporting message to its serving base station (e.g., the base station 210) indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the RAN 200. Each of the cells may measure a strength of the pilot signal, and the radio access network (e.g., one or more of the base stations 210 and 214/216 and/or a central node within the core network) may determine a serving cell for the UE 224. As the UE 224 moves through the RAN 200, the network may continue to monitor the uplink pilot signal transmitted by the UE 224. When the signal strength or quality of the pilot signal measured by a neighboring cell exceeds that of the signal strength or quality measured by the serving cell, the RAN 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the RAN 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple radio access technologies (RATs). For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation 1-R3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4-a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

The air interface in the RAN 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the RAN 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), cross-division duplex (xDD), or flexible duplex.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CUs, the DUs, and the RUs also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
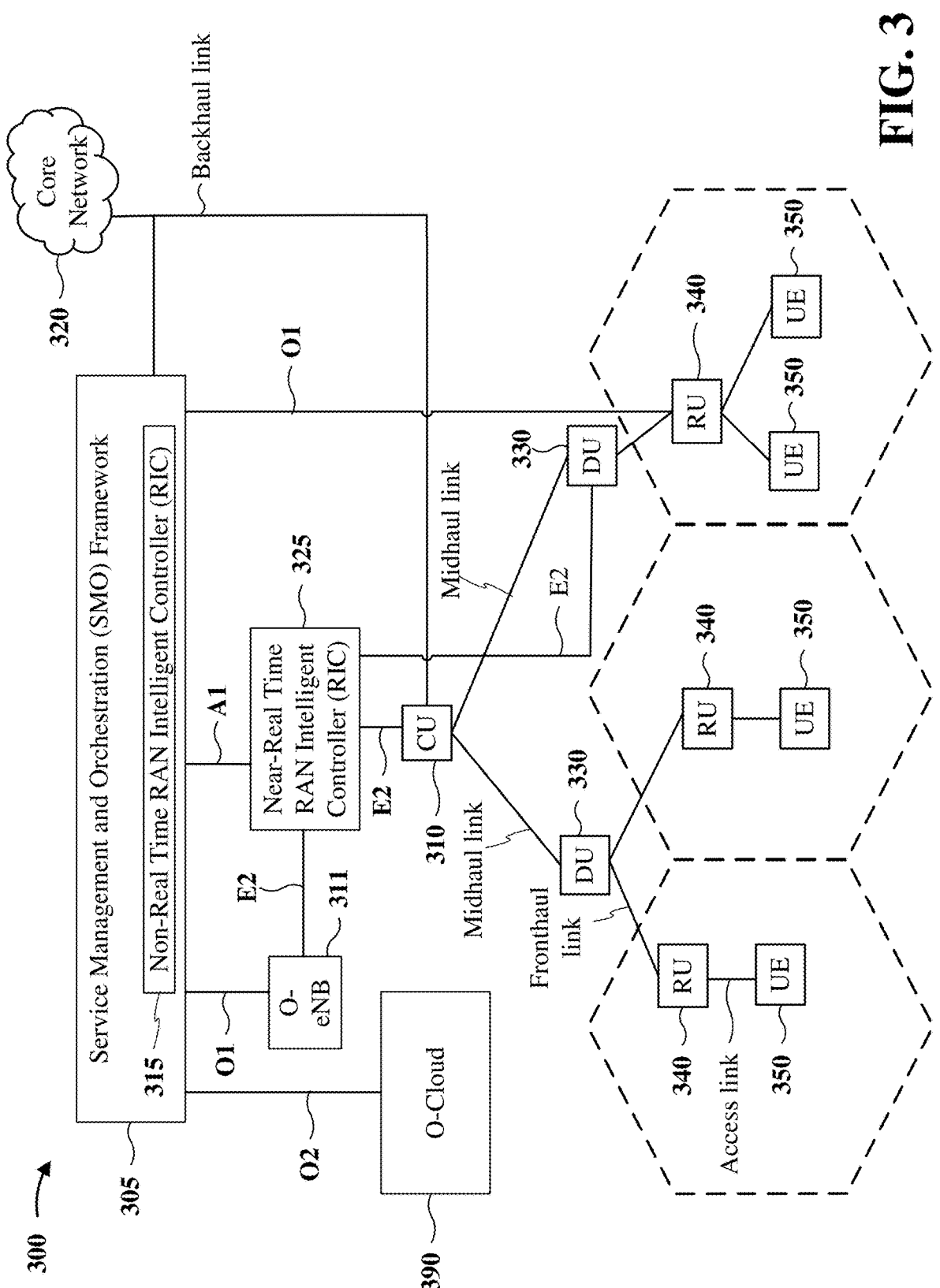
FIG. 3 is a diagram providing a high-level illustration of one example of a configuration of a disaggregated base station according to some aspects.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 350 via one or more radio frequency (RF) access links. In some implementations, the UE 350 may be simultaneously served by multiple RUs 340.

Each of the units, i.e., the CUs 310, the DUs 330, the RUs 340, as well as the Near-RT RICs 325, the Non-RT RICs 315 and the SMO Framework 305, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units. In some aspects, the CU 310 may host one or more higher layer control functions.

Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (i.e., Central Unit-User Plane (CU-UP)), control plane functionality (i.e., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the distributed unit (DU) 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the 3$^{rd}$ Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 350. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (such as an O1 interface). For virtualized network elements, the SMO Framework 305 may be configured to interact with a cloud computing platform (such as an open cloud (O-Cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340 and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
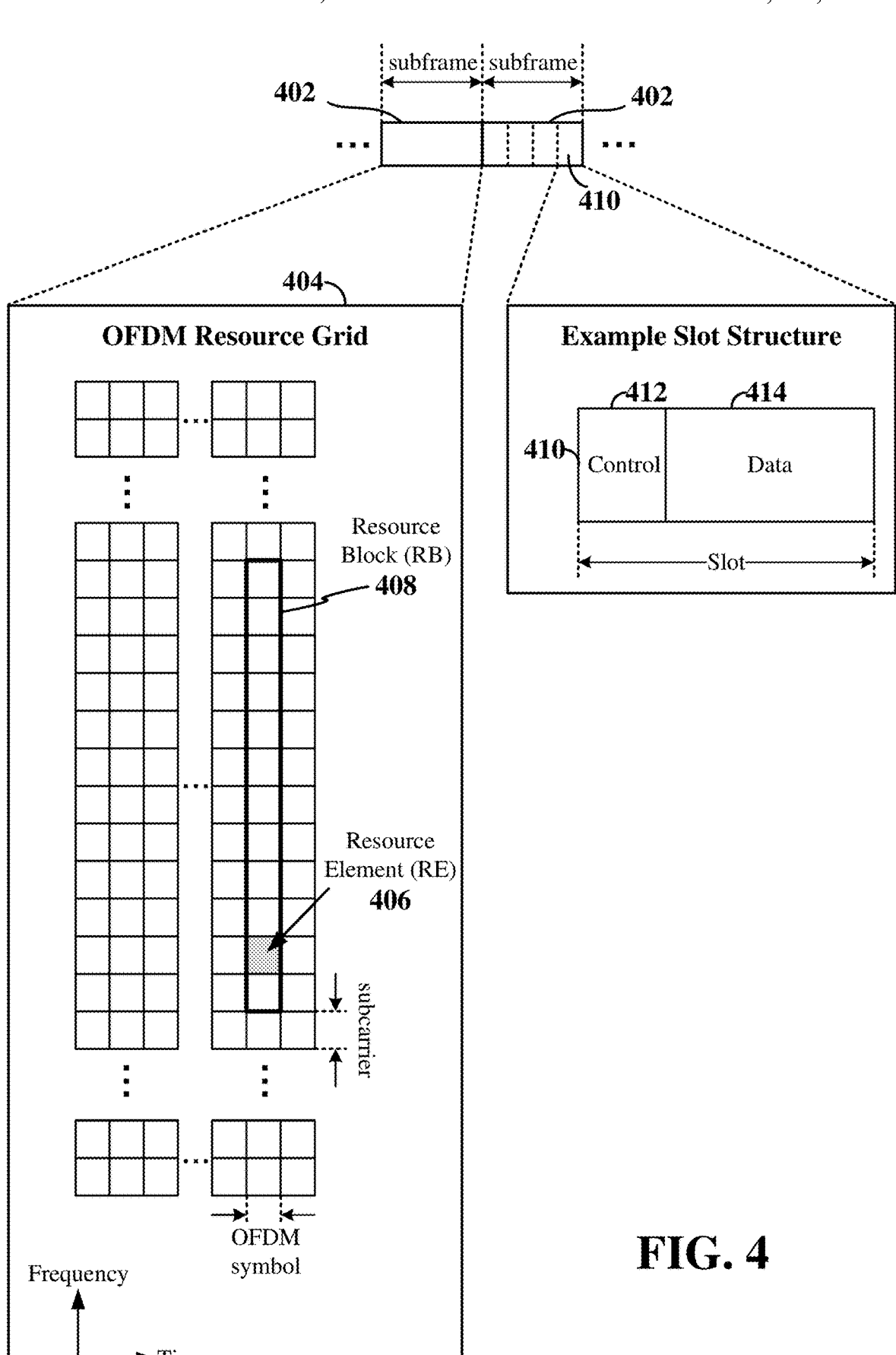
FIG. 4 is a schematic illustration of wireless resources in an air interface utilizing orthogonal frequency divisional multiplexing (OFDM) according to some aspects.

Various aspects of the present disclosure will be described with reference to an OFDM waveform, an example of which is schematically illustrated in FIG. 4. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 4, an expanded view of an example subframe 402 is illustrated, showing an OFDM resource grid. However, as those skilled in the art will readily appreciate, the physical (PHY) layer transmission structure for any particular application may vary from the example described here, depending on any number of factors. Here, time is in the horizontal direction with units of OFDM symbols; and frequency is in the vertical direction with units of subcarriers of the carrier.

The resource grid 404 may be used to schematically represent time-frequency resources for a given antenna port. In some examples, an antenna port is a logical entity used to map data streams to one or more antennas. Each antenna port may be associated with a reference signal (e.g., which may allow a receiver to distinguish data streams associated with the different antenna ports in a received transmission). An antenna port may be defined such that the channel over which a symbol on the antenna port is conveyed can be inferred from the channel over which another symbol on the same antenna port is conveyed. Thus, a given antenna port may represent a specific channel model associated with a particular reference signal. In some examples, a given antenna port and sub-carrier spacing (SCS) may be associated with a corresponding resource grid (including REs as discussed above). Here, modulated data symbols from multiple-input-multiple-output (MIMO) layers may be combined and re-distributed to each of the antenna ports, then precoding is applied, and the precoded data symbols are applied to corresponding REs for OFDM signal generation and transmission via one or more physical antenna elements. In some examples, the mapping of an antenna port to a physical antenna may be based on beamforming (e.g., a signal may be transmitted on certain antenna ports to form a desired beam). Thus, a given antenna port may correspond to a particular set of beamforming parameters (e.g., signal phases and/or amplitudes).

In a MIMO implementation with multiple antenna ports available, a corresponding multiple number of resource grids 404 may be available for communication. The resource grid 404 is divided into multiple resource elements (REs) 406. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 408, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain Within the present disclosure, it is assumed that a single RB such as the RB 408 entirely corresponds to a single direction of communication (either transmission or reception for a given device).

A set of continuous or discontinuous resource blocks may be referred to herein as a Resource Block Group (RBG), sub-band, or bandwidth part (BWP). A set of sub-bands or BWPs may span the entire bandwidth. Scheduling of scheduled entities (e.g., UEs) for downlink, uplink, or sidelink transmissions typically involves scheduling one or more resource elements 406 within one or more sub-bands or bandwidth parts (BWPs). Thus, a UE generally utilizes only a subset of the resource grid 404. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a scheduling entity, such as a base station (e.g., gNB, eNB, etc.), or may be self-scheduled by a UE implementing D2D sidelink communication.

In this illustration, the RB 408 is shown as occupying less than the entire bandwidth of the subframe 402, with some subcarriers illustrated above and below the RB 408. In a given implementation, the subframe 402 may have a bandwidth corresponding to any number of one or more RBs 408. Further, in this illustration, the RB 408 is shown as occupying less than the entire duration of the subframe 402, although this is merely one possible example.

Each 1 ms subframe 402 may consist of one or multiple adjacent slots. In the example shown in FIG. 4, one subframe 402 includes four slots 410, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 410 illustrates the slot 410 including a control region 412 and a data region 414. In general, the control region 412 may carry control channels, and the data region 414 may carry data channels. Of course, a slot may contain all DL, all UL, or at least one DL portion and at least one UL portion. The structure illustrated in FIG. 4 is merely an example, and different slot structures may be utilized, and may include one or more of each of the control region(s) and data region(s).

Although not illustrated in FIG. 4, the various REs 406 within an RB 408 may be scheduled to carry one or more physical channels, including control channels, shared channels, data channels, etc. Other REs 406 within the RB 408 may also carry pilots or reference signals. These pilots or reference signals may provide for a receiving device to perform channel estimation of the corresponding channel, which may enable coherent demodulation/detection of the control and/or data channels within the RB 408.

In some examples, the slot 410 may be utilized for broadcast, multicast, groupcast, or unicast communication. For example, a broadcast, multicast, or groupcast communication may refer to a point-to-multipoint transmission by one device (e.g., a base station, UE, or other similar device) to other devices. Here, a broadcast communication is delivered to all devices, whereas a multicast or groupcast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 406 (e.g., within the control region 412) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry hybrid automatic repeat request (HARQ) feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 406 (e.g., in the control region 412 or the data region 414) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 30, 80, or 130 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional (remaining) system information. The MIB and SIB1 together provide the minimum system information (SI) for initial access. Examples of system information transmitted in the MIB may include, but are not limited to, a subcarrier spacing (e.g., default downlink numerology), system frame number, a configuration of a PDCCH control resource set (CORESET) (e.g., PDCCH CORESET0), a cell barred indicator, a cell reselection indicator, a raster offset, and a search space for SIB1. Examples of remaining minimum system information (RMSI) transmitted in the SIB1 may include, but are not limited to, a random access search space, a paging search space, downlink configuration information, and uplink configuration information. A base station may transmit other system information (OSI) as well.

In an UL transmission, the UE may utilize one or more REs 406 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), i.e., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 406 (e.g., within the data region 414) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 406 within the data region 414 may be configured to carry other signals, such as one or more SIB s and DMRSs.

In an example of sidelink communication over a sidelink carrier via a proximity service (ProSe) PC5 interface, the control region 412 of the slot 410 may include a physical sidelink control channel (PSCCH) including sidelink control information (SCI) transmitted by an initiating (transmitting) sidelink device (e.g., a transmitting (Tx) V2X device or other Tx UE) towards a set of one or more other receiving sidelink devices (e.g., a receiving (Rx) V2X device or some other Rx UE). The data region 414 of the slot 410 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 406 within slot 410. For example, HARQ feedback information may be transmitted in a physical sidelink feedback channel (PSFCH) within the slot 410 from the receiving sidelink device to the transmitting sidelink device. In addition, one or more reference signals, such as a sidelink SSB, a sidelink CSI-RS, a sidelink SRS, and/or a sidelink positioning reference signal (PRS) may be transmitted within the slot 410.

These physical channels described above are generally multiplexed and mapped to transport channels for handling at the medium access control (MAC) layer. For example, a transport block may include multiple subframes such as the subframes 402 shown in FIG. 4. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-4 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

As mentioned above, a base station may use a downlink control region of a slot to send PDCCH information to a UE.

Figure 5:
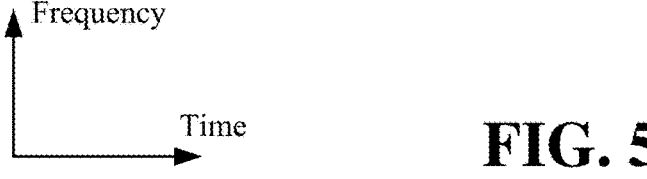
FIG. 5 is a schematic illustration of an example of a downlink control region of a slot according to some aspects.
Figure 6:
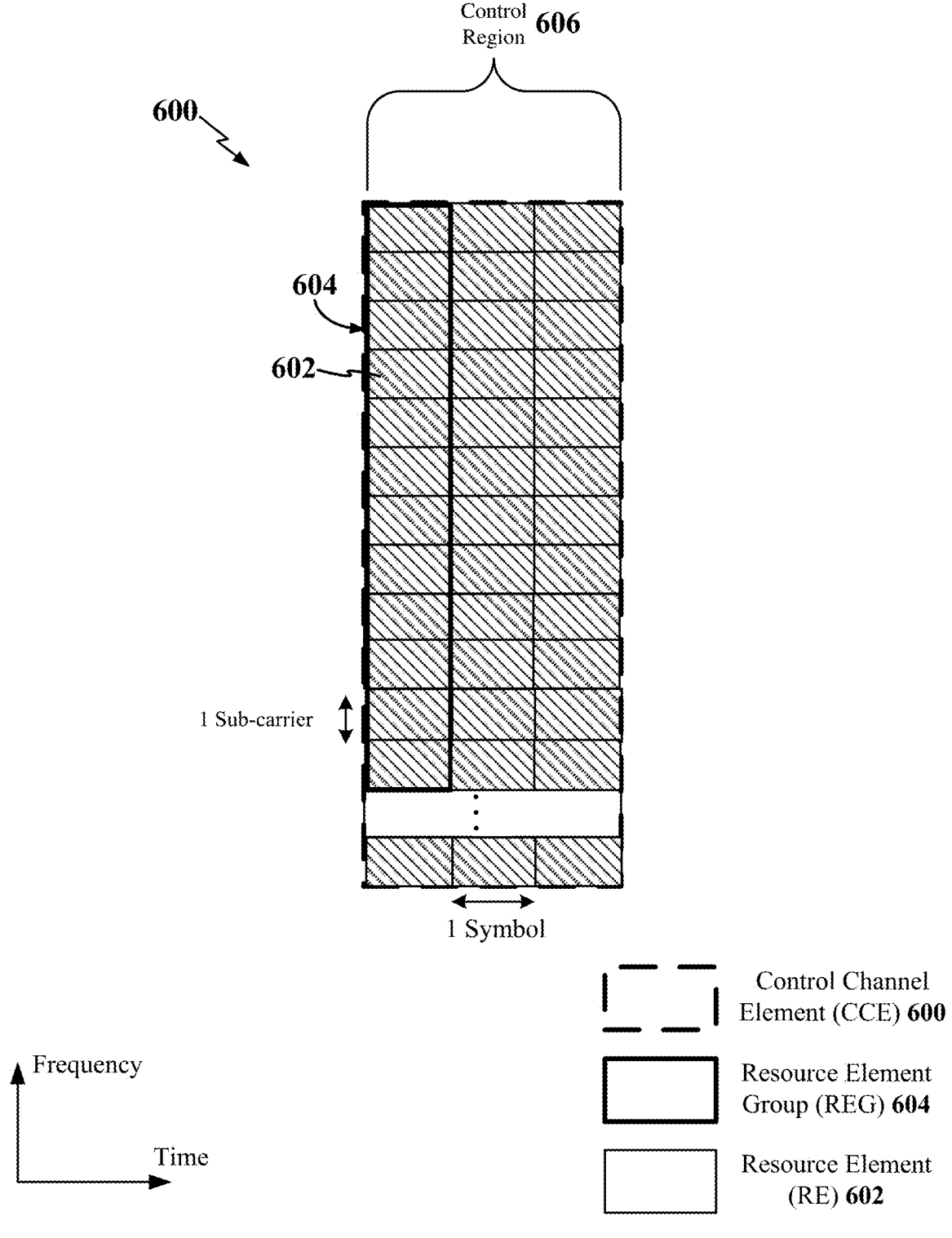
FIG. 6 is a schematic illustration of an example of a control channel element structure according to some aspects.

In some examples, the PDCCH information may be a scheduling DCI that schedules a downlink transmission to a UE, a scheduling DCI that schedules an uplink transmission by a UE, or a scheduling DCI that schedules some other transmission. In some examples, the PDCCH information may be a non-scheduling DCI (e.g., a DCI that carries information, but does not schedule a transmission). FIGS. 5 and 6 describe example resource configurations that may be used to carry such PDCCH information.

FIG. 5 is a schematic illustration of an example of a downlink (DL) control region 502 of a slot according to some aspects. The DL control region 502 may correspond, for example, to the control region 412 of the slot 410 illustrated in FIG. 4. As discussed above, the DL control region 502 may carry a PDCCH that includes one or more DCIs.

The DL control region 502 includes a plurality of CORESETs 504 indexed as CORESET #1-CORESET #N. Each CORESET 504 includes a number of sub-carriers in the frequency domain and one or more symbols in the time domain. In the example of FIG. 5, each CORESET 504 includes at least one control channel element (CCE) 506 having dimensions in both frequency and time, sized to span across at least three OFDM symbols. A CORESET 504 having a size that spans across two or more OFDM symbols may be beneficial for use over a relatively small system bandwidth (e.g., 5 MHz). However, a one-symbol CORESET may be used in some scenarios.

In some examples, a base station may configure a CORESET 504 for carrying group common control information or UE-specific control information, whereby the CORESET 504 may be used for transmission of a PDCCH including the group common control information or the UE-specific control information to one or more UEs. Each UE may be configured to monitor one or more CORESETs 504 for the UE-specific or group common control information (e.g., on a PDCCH).

In some examples, the PDCCH may be constructed from a variable number of CCEs, depending on the PDCCH format (e.g., aggregation level). Each PDCCH format (e.g., aggregation level) supports a different DCI length. In some examples, PDCCH aggregation levels of 1, 2, 4, 8, and 16 may be supported, corresponding to 1, 2, 4, 8, or 16 contiguous CCEs, respectively.

FIG. 6 is a schematic illustration of an example of a CCE structure 600 in a DL control region 606 of a slot according to some aspects. The DL control region 606 may correspond, for example, to the control region 412 of the slot 410 illustrated in FIG. 4. The CCE structure 600 includes a number of REs 602 that may be grouped into at least one RE group (REG) 604. Each REG 604 generally may contain, for example, twelve consecutive REs 602 (or nine REs 602 and three DMRS REs) within the same OFDM symbol and the same RB. In the example of FIG. 6, the CCE structure 600 includes at least six REGs 604 (not shown in their entirety) distributed across three OFDM symbols. However, as those skilled in the art will readily appreciate, the CCE structure 600 for any particular application may vary from the example described herein, depending on any number of factors. For example, the CCE structure 600 may contain any suitable number of REGs.

In some examples, a UE may be unaware of the particular aggregation level of the PDCCH or whether multiple PDCCHs may exist for the UE in the slot. Consequently, the UE may perform blind decoding of various PDCCH candidates within the first N control OFDM symbols of the slot (as indicated by the slot format of the slot) and/or other OFDM symbols of the slot. In some examples, this decoding is based on a radio network temporary identifier (RNTI) (e.g., a UE-specific RNTI or a group RNTI) that the base station is expected to use when encoding the PDCCH. Each PDCCH candidate includes a collection of one or more consecutive CCEs based on an assumed DCI length (e.g., PDCCH aggregation level). The term PDCCH candidate is used here to emphasize that the UE might not be configured with information indicating exactly what type of PDCCH is carried within a slot or where a particular PDCCH is carried within a slot. Thus, with blind decoding, the UE attempts to decode signals received on different sets of resource (e.g., corresponding to different PDCCH candidates) to determine whether those resources are actually carrying a PDCCH.

To limit the number of blind decodes performed by a UE, a base station may configure certain search spaces such as UE-specific search spaces (USSs) and common search spaces (CSSs). Here, the base station may send a PDCCH to a UE or a set of UEs only on the resources specified for the configured search space(s). Thus, the UE or UEs may limit their blind decoding to the configured search space(s). In some examples, the base station may configure one or more search space sets, each of which includes at least one search space. In some examples, different search space sets may be assigned different search space set identifiers (IDs). In some examples, a search space set ID may be referred to as a search space set index.

A UE-specific search space set consist of CCEs used for sending control information to a particular UE. The starting point (offset or index) of a UE-specific search space may be different for each UE. In addition, each UE may have multiple UE-specific search spaces (e.g., a respective one for each aggregation level).

A common search space set consists of CCEs used for sending control information that is common to a group of UEs or to all UEs (e.g., under a given cell). Thus, a common search space set may be monitored by multiple UEs in a cell. The starting point (offset or index) of a search space set for group common control information may be the same for all UEs in the group and there may be multiple search space sets defined for group common control information (e.g., a respective one for each configured aggregation level for the group of UEs).

A UE may perform blind decoding over all aggregation levels and corresponding USSs or CSSs to determine whether at least one valid DCI is carried by the UE-specific search space (USS) or the common search space (CSS) for the UE. By using search space sets (e.g., USSs and CSSs) configured for at least one UE for this blind decoding, the number of blind decodes that each UE performs for each PDCCH format combination may be reduced (e.g., as compared to a scenario that does not use search space sets).

A UE may monitor a search space for downlink assignments and uplink grants relating to a particular component carrier for the UE. For example, the UE may monitor the search space for a PDCCH that includes a DCI that schedules a PDSCH in the same slot or in a different slot for that component carrier. In this case, the DCI includes a frequency domain resource assignment and a time domain resource assignment for a PDSCH and other information (e.g., MCS, etc.) that enables the UE to decode the PDSCH.

Figure 7:
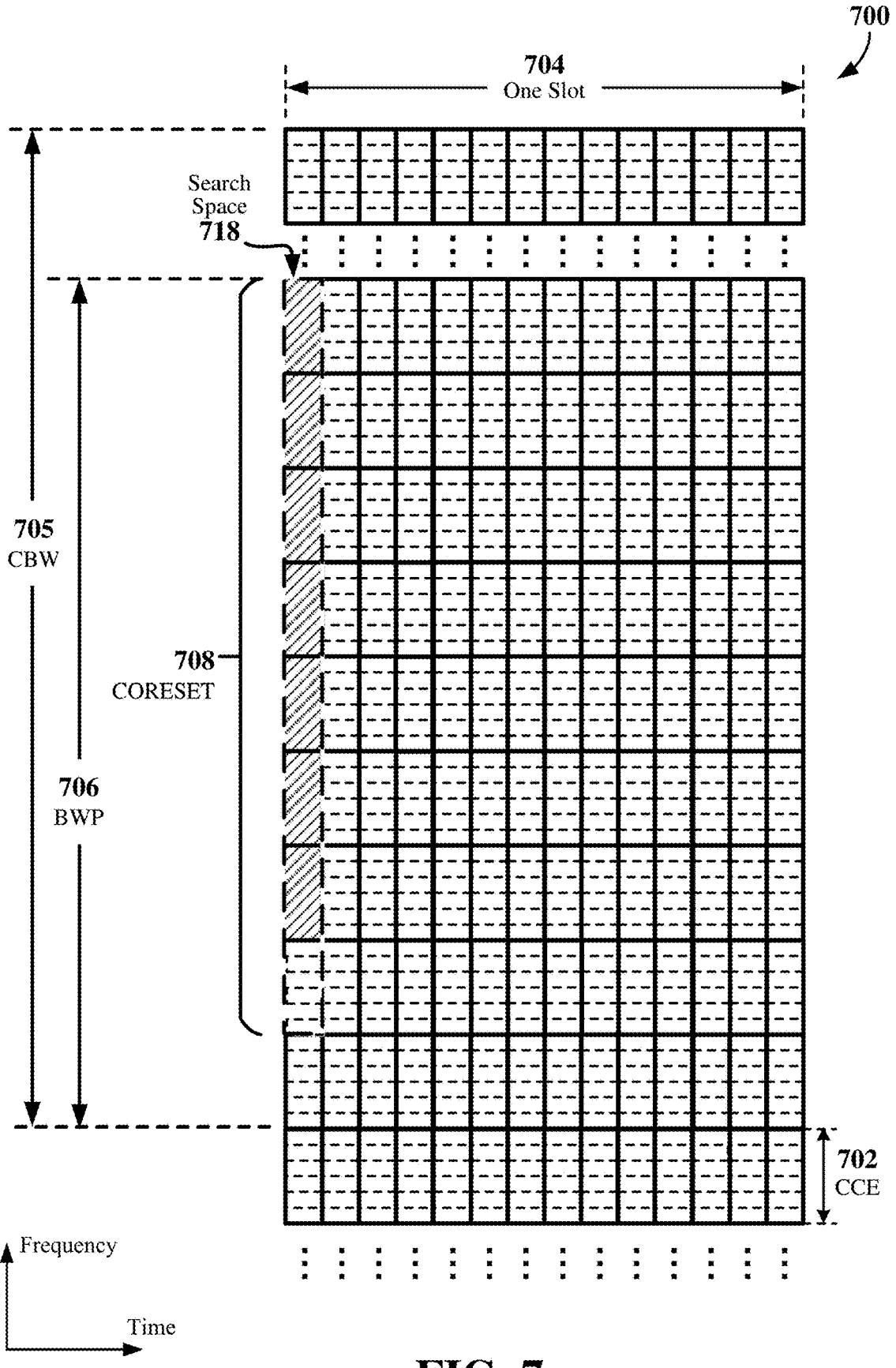
FIG. 7 is a schematic illustration of an example of downlink time-frequency resources according to some aspects.

FIG. 7 is a schematic illustration of an example of downlink time-frequency resources 700, where a search space is defined within a CORESET. In FIG. 7, time is in the horizontal direction with units of OFDM symbols and frequency is in the vertical direction with units of CCEs. For example, the vertical dimension of each major solid line rectangle represents one CCE 702. Each CCE 702 includes 6 resource element groups (REGs). Each REG may correspond to one physical resource block (PRB), including 12 resource elements (REs) in the frequency domain and one OFDM symbol in the time domain. The 6 REGs of each CCE 702 are respectively represented by a minor dashed line rectangle. One slot 704 in the time domain is represented. Other resource configurations may be used in other examples.

FIG. 7 depicts one bandwidth part (BWP) 706 within a carrier bandwidth (CBW) 705. According to some aspects, the BWP 706 is a contiguous set of physical resource blocks (PRBs) on a given carrier. In the example of FIG. 7, the contiguous set of PRBs are represented by a contiguous set of CCEs 702. In addition, the BWP 706 corresponds to a set of 64 PRBs, which represent 648 subcarriers (i.e., 12 REs/REG×6 REGs/CCE×9 CCEs). A base station may configure different sets of these CCEs as common CCEs or UE-specific CCEs.

In the example of FIG. 7, a CORESET 708 includes 48 REGs in one set of eight CCEs (where each CCE may be similar to the CCE 702). The eight CCEs may be grouped as a first DCI.

A CORESET may include a one or more search spaces. A search space may include all or a portion of a CORESET. A CORESET may be associated with a common search space, a UE-specific search space, or a combination of both. In the example of FIG. 7, one search space (SS) 718 is indicated for the CORESET 708 (represented by the slanted lines).

A search space may include a number of PDCCH candidates. As mentioned above, a UE may attempt to blind decode a PDCCH candidate in each search space; even if a base station did not schedule a PDCCH in any given search space.

The following relationships between CORESETs, BWPs, and search spaces are made with reference to some examples of NR; however, the following is an example and non-limiting and other relationships between CORESETs, BWPs, and search spaces (or their equivalents, for example in other radio technologies) are within the scope of the disclosure. In some examples, for a given UE, a base station may configure up to three CORESETs in a BWP of a serving cell (e.g., a component carrier (CC)), including both common and UE-specific CORESETs. In addition, the base station may configure up to four BWPs per serving cell, with one of the BWPs active at a given time. Accordingly, a maximum number of CORESETs for a UE per serving cell may be twelve (e.g., 3 CORESETs per BWP×4 BWPs per serving cell) in these examples. The resource elements of a CORESET may be mapped to one or more CCEs. One or more CCEs from one CORESET may be aggregated to form the resources used by one PDCCH. In some examples, the maximum number of search spaces per BWP may be ten (10). In some examples, multiple search spaces may use the time-frequency resources of one CORESET.

A base station may send a PDCCH to a UE via the downlink time-frequency resources 700 (e.g., within a configured search space). In some examples, the base station may compute a cyclic redundancy check (CRC) of a payload of a DCI carried by a PDCCH. The CRC may be scrambled using an identifier of a UE. An example of such an identifier may be a radio network temporary identifier (RNTI), such as a random access-radio network temporary identifier (RA-RNTI).

During blind decoding of a search space, the UE may attempt to descramble CRC of a PDCCH candidate using an RNTI. For example, the UE may compute a CRC on the payload of the corresponding DCI using the same procedure as used by the base station, and then compare the CRCs. If the CRCs are equal, the DCI was destined for the UE. If the payload was corrupted or the CRC was scrambled using another UE's RNTI, then the CRCs would not match, and the UE may disregard the DCI.

Figure 8:
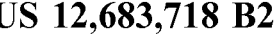
FIG. 8 is a signaling diagram illustrating an example of signaling associated with scheduling a physical downlink shared channel (PDSCH) according to some aspects.

FIG. 8 is a signaling diagram 800 illustrating an example of PDSCH scheduling in a wireless communication system including a network entity 802 and a user equipment 804. In some examples, the network entity 802 may correspond to any of the network entities, base stations, CUs, DUs, RUs, or scheduling entities shown in any of FIGS. 1, 2, 3, 10, and 13. In some examples, the user equipment 804 may correspond to any of the UEs or scheduled entities shown in any of FIGS. 1, 2, 3, 10, and 11.

At #806 of FIG. 8, the network entity 802 transmits (e.g., via RRC messaging) CORESET and SS configurations that the user equipment 804 is to use for receiving information from the network entity 802. For example, a CORESET configuration for the UE may specify the RBs and the number of symbols for each CORESET configured for the user equipment 804. In addition, an SS configuration may specify, for each configured SS set, the associated CORESET, PDCCH candidates, and so on.

At #808, the user equipment 804 repeatedly monitors the configured SS sets to determine whether the network entity 802 has transmitted any messages to the user equipment 804. As discussed herein, this may involve blind decoding for PDCCH candidates in a search space configured for the user equipment 804.

At #810, at some point in time, the network entity 802 schedules a PDSCH transmission for the user equipment 804. As discussed herein, a DCI may be used to inform the user equipment 804 of a scheduled transmission. Accordingly, at #812, the network entity 802 transmits a DCI to the user equipment 804 via one or more PDCCH candidates, where the DCI indicates a scheduled PDSCH transmission. In addition, at #814, the network entity 802 transmits a PDSCH transmission to the user equipment 804 on a scheduled resource. In some examples, the network entity 802 may transmit the DCI and a PDSCH in the same slot.

At #816, the user equipment 804 decodes the DCI and, at #818, the user equipment 804 decodes the PDSCH. In some examples, during the reception of a slot that includes a DCI, the user equipment 804 may decode the DCI and, based on the DCI information, decode the next PDSCH.

At #820, the user equipment 804 sends a HARQ-Ack to the network entity 802 to indicate whether the user equipment 804 successfully decoded the PDSCH transmission.

Monitoring a PDCCH channel to detect whether a DCI was sent for a UE is one of the main power consuming operations in current 5G NR baseband receivers. This PDCCH-related power consumption may be even more of an issue when wider bandwidths are used (e.g., for bands such as FR4 and FR5, and for 6G applications).

In some aspects, the power consumption associated with PDCCH monitoring may be highly related to the potential bandwidth in which the PDCCH and the corresponding PDSCH may be allocated. As one example, the power consumption related to receiver components such as analog-to-digital converters (ADCs) and a digital front-end (DFE) that are used to sample a received signal may be higher for higher PDCCH and PDSCH bandwidths (e.g., a higher sampling rate may be used for wider bandwidths). As another example, the power consumption of the baseband processing related to PDCCH monitoring increases with the bandwidth of the search space (e.g., since there may be more PDCCH candidate blind decoding hypotheses to process when the search space bandwidth is wider). Thus, in some aspects, it is desirable to reduce the power consumption of a UE, particularly for UEs that operate in the sub-Terahertz (Sub-THz) bands (e.g., FR4, FR5, etc.).

The disclosure relates in some aspect to a scenario where a UE is scheduled for a retransmission of a transport block signal, whereby the potential bandwidth of both the PDCCH and the PDSCH allocations may be significantly reduced (e.g., as compared to convention retransmission schemes). In some aspects, the use of such a retransmission mechanism may enable the UE to reduce its overall power consumption.

In some examples, a network entity (e.g., a gNB) may reserve resources on a carrier for transmission of a transport block. The reserved resources may span two or more consecutive or non-consecutive slots. In some examples, the transport block may be segmented into a plurality of encoded code blocks (e.g., such that each encoded code block is fully contained within a single slot).

In some examples, a UE that receives the transport block may determine whether each encoded block passes a CRC test, and then generate corresponding acknowledgement information (e.g., an ACK or a NACK) for each encoded code block and transmit this information to the network entity via uplink control information (UCI). In a scenario where the UE transmits a NACK for an encoded code block, the network entity may retransmit that encoded code block.

In some examples, code block grouping may be used to enable a UE to provide more accurate feedback to the network entity regarding which code blocks (or group of code blocks) failed to pass CRC and therefore should be retransmitted. For example, a network entity may transmit a transport block that includes several code blocks (e.g., CB #0, CB #1, . . . , CB #k−1). The code blocks may be organized into different code block groups (e.g., each group including one or more code blocks). In the event only some of the code block groups failed to pass CRC at the UE, the UE may send UCI to the network entity that indicates the code block group(s) that failed CRC and the code block group(s) that passed CRC. In this case, the network entity may elect to retransmit only the code block groups(s) that failed CRC.

Due to the channel selectivity both in time and frequency, as well as other imbalances (such as the distance of the data from the DMRS, channel estimation quality at the edges of the resource allocation, etc.), each code block may be received and detected with different quality. In some examples, a system may target a 10% transport block error rate. In such a case, it is expected that in case of an error only a few code blocks would fail. Thus, the use of code block group based retransmission as discussed above may provide a significant reduction in retransmission overhead (e.g., as compared to retransmissions schemes that retransmit all code blocks).

Based on the feedback from the UE, the network entity is likely to allocate a smaller bandwidth for a retransmission in which only the failed code block (or failed groups of code blocks) are to be transmitted. For example, FIG. 9 illustrates an example of transmission bandwidths 900 for a first transmission 902 from a network entity to a UE and a retransmission 904 associated with the first transmission.

Figure 9:
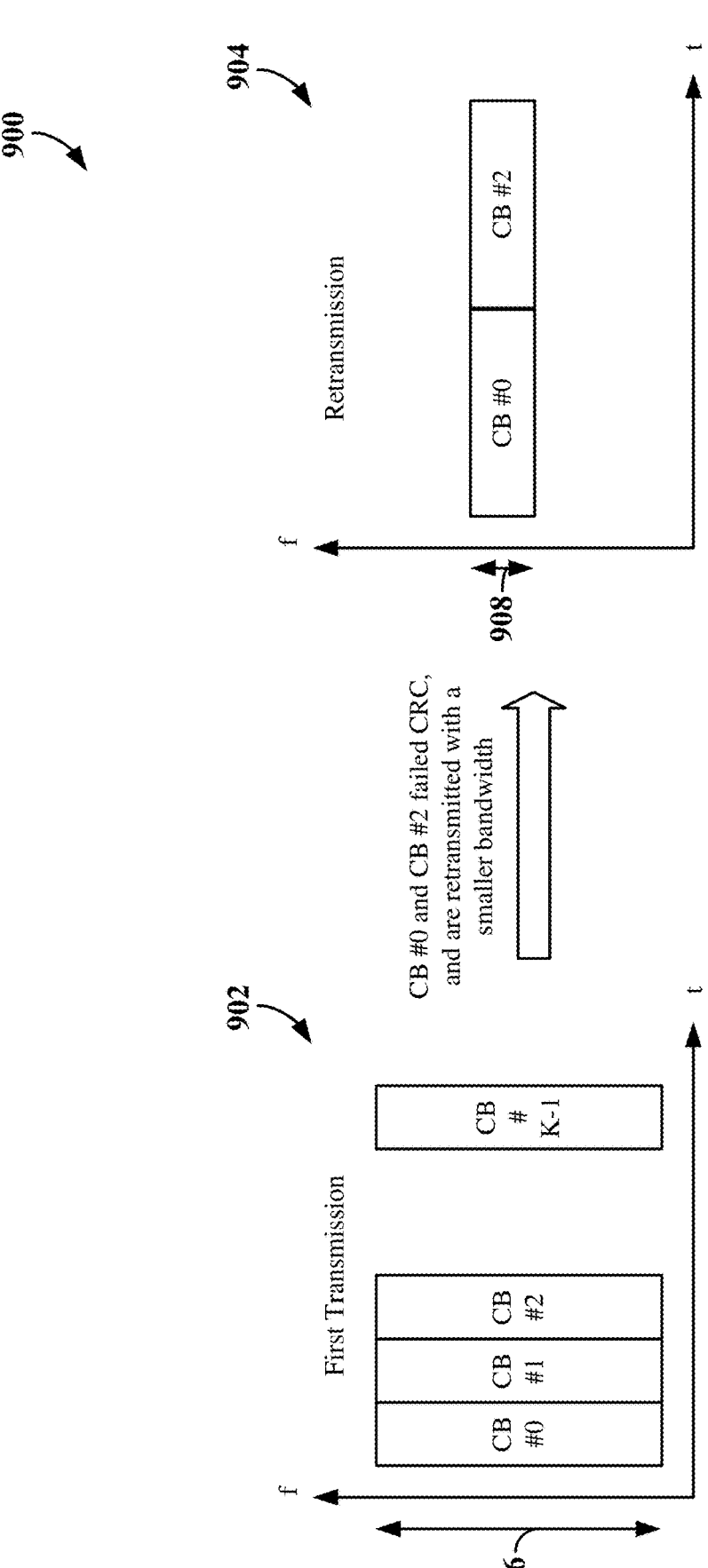
FIG. 9 is a conceptual illustration of an example of transmission bandwidths according to some aspects.

The first transmission 902 by the network entity includes K code blocks, labeled CB #0, CB #1, CB #2, . . . , CB #K−1 in FIG. 9. In the event only CB #0 and CB #2 failed CRC at the UE, the network entity only includes CB #0 and CB #2 in the retransmission.

Moreover, as indicated in FIG. 9, the first transmission 902 is transmitted over a first bandwidth 906, while the retransmission 904 is transmitted over a second bandwidth 908 that is smaller than the first bandwidth 906. In some aspects, a smaller bandwidth may be used for the retransmission 904 since there is less data to transmit for the retransmission 904. In some aspects, a smaller bandwidth may be used for the retransmission 904 since fewer resources may be used for each code block during the retransmission 904.

The bandwidth to be used for the transmissions of FIG. 9 may be signaled in the scheduling DCI. For example, a first DCI that schedules the PDSCH for the first transmission 902 in a given slot (e.g., a first slot) may indicate the first bandwidth 906 (e.g., 10 RBs). In addition, a second DCI that schedules the PDSCH for the retransmission 904 in another slot (e.g., a fourth slot) may indicate the second bandwidth 908 (e.g., 2 RBs).

Conventionally, the same PDCCH CORESET search space is used for the first DCI for the first transmission 902 and the second DCI for the retransmission 904. That is, the UE will monitor the same search space for DCI transmissions in either case.

In some examples, a UE might not fully benefit from the smaller resource allocation of the retransmission due to the processing time associated with decoding the PDCCH. For example, during the time the UE is decoding the PDCCH, the UE may have to buffer the PDSCH data received during the slot. In this case, the UE may still monitor the wider PDSCH bandwidth since it has not yet determined that a smaller bandwidth is being used. Consequently, the UE might not realize as much of a reduction in power consumption as would otherwise be possible (e.g., since the receiver ADCs and other components are still configured for the wider bandwidth).

The disclosure relates in some aspect to techniques for retransmissions that involve a reduced bandwidth for the PDCCH CORESET search space and a reduced bandwidth for the PDSCH resource allocation. For example, for a slot used for a retransmission, a smaller PDCCH CORESET search space may be defined (e.g., as compared to the PDCCH CORESET search space used for the first transmission). In addition, the DCI for this slot may specify a smaller PDSCH bandwidth for the retransmission (e.g., as discussed above).

In some examples, a network entity may determine that for subsequent retransmissions a reduced bandwidth will be used for the PDCCH CORESET search space and a reduced bandwidth will be used for the PDSCH resource allocation. In addition, the network entity may transmit an indication of the reduced bandwidth to the UE. In some examples, this indication may be semi-static (e.g., the indication applies to any retransmissions that occur over a specified number of slots, or until another indication is sent by the network entity).

In some aspects, this bandwidth reduction technique may enable a UE to determine, prior to a retransmission slot, that a narrower bandwidth is being used for the retransmission. Thus, the UE may adjust its receiver components accordingly and thereby reduce its power consumption.

In some examples, a network entity may determine the amount of the bandwidth reduction based on the feedback received from the UE. For example, if the ACK/NACK feedback indicated that all of the code blocks failed CRC, the network entity may elect to reduce the bandwidth according to a first percentage (e.g., use 80% of the bandwidth for the retransmission). As another example, if the ACK/NACK feedback indicated that only 10% of the code blocks failed CRC, the network entity may elect to reduce the bandwidth according to a second percentage (e.g., use 40% of the bandwidth for the retransmission). Other percentages or reduction amounts may be used in other examples.

In some examples, a network entity may signal to a UE the bandwidth reduction rate and the retransmission position with respect to the first transmission parameters, mapped to the ratio between ACK and NACK received via UE feedback. For example, the network entity may send a set of parameters (e.g., a table) that specify a first bandwidth reduction associated with a first NACK/ACK ratio, a second bandwidth reduction associated with a second NACK/ACK ratio, a third bandwidth reduction associated with a third NACK/ACK ratio, and so on.

In some aspects, in scenarios where the retransmission is sent via a subset of the original bandwidth (e.g., the bandwidth for the first transmission), each bandwidth reduction parameter may correspond to (e.g., indicate) a particular offset within the original bandwidth at which the retransmission will be sent. For example, the bandwidth for the first bandwidth reduction may be offset by 0 RBs from the beginning of the original bandwidth, the bandwidth for the second bandwidth reduction may be offset by 2 RBs from the beginning of the original bandwidth, the bandwidth for the third bandwidth reduction may be offset by 6 RBs from the beginning of the original bandwidth, and so on. Other offsets may be used in other examples.

In some examples, the same bandwidth reduction and/or offset parameters may be applicable to the PDCCH CORESET search space and the PDSCH resource allocation. For example, a 50% NACK/ACK ratio may map to a 40% reduction in the PDCCH CORESET search space and a 40% reduction in the PDSCH resource allocation. Other percentages may be used in other examples.

In some examples, different bandwidth reduction and/or offset parameters may be applicable to the PDCCH CORESET search space and the PDSCH resource allocation. For example, a 100% NACK scenario may map to a 0% reduction in the PDCCH CORESET search space and a 20% reduction in the PDSCH resource allocation. As another example, a 50% NACK/ACK ratio may map to a 30% reduction in the PDCCH CORESET search space and a 60% reduction in the PDSCH resource allocation. Other percentages may be used in other examples.

The UE may thus determine the reduction in bandwidth according to the ACK/NACK the UE sent to the network entity and the bandwidth reduction parameters the UE received from the network entity. For example, if the UE sent two ACKs and two NACKs to the network entity, the UE may thereby determine that there a 50% reduction in bandwidth will be used for the retransmission.

In some examples, the network entity may indicate to the UE the delay (e.g., a number of slots) corresponding to the scheduled retransmission. For example, the network entity may send an indication to the UE specifying that from this point forward (e.g., the indication applies to any retransmissions that occur over a specified number of slots, or until another indication is sent by the network entity), the retransmission will occur a certain number of slots (e.g., 4 slots) after the previous transmission of the same information. This indication may be signal via DCI, a MAC-CE, an RRC message, or some other type of signaling. Other delays may be used in other examples.

In view of the above, the disclosure relates in some aspect to using a dedicated CORESET search space for retransmissions. For example, a first PDCCH CORESET search space may be used for first transmissions and a second PDCCH CORESET search space, different from the first PDCCH CORESET search space, may be used for retransmissions associated with the first transmission.

Thus, reductions in bandwidth may be achieved for a PDCCH CORESET search space and/or for a PDSCH resource allocation. By reducing the potential bandwidth associated with retransmissions signals, the power consumption of the UE may be significantly reduced.

Figure 10:
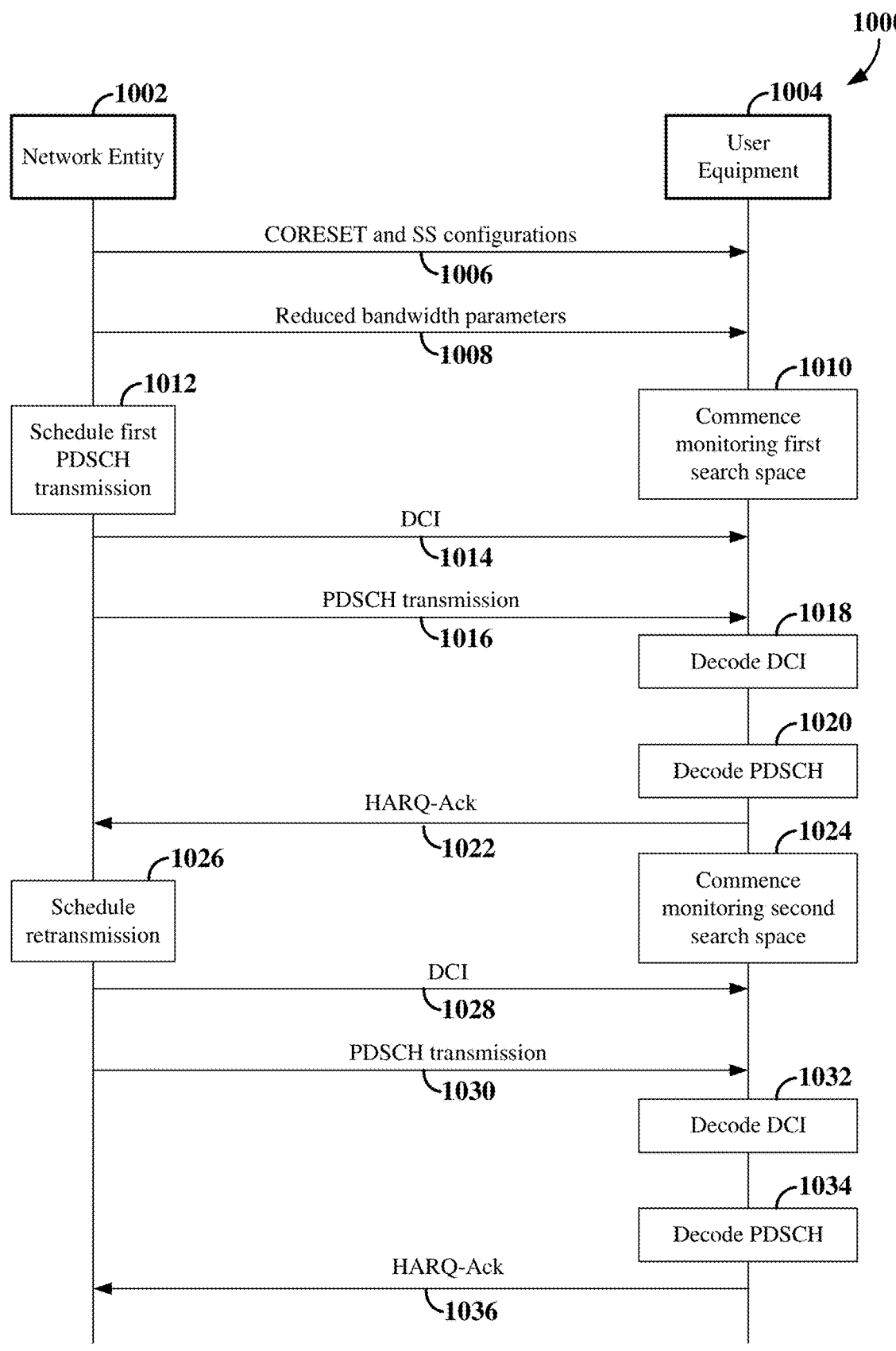
FIG. 10 is a signaling diagram illustrating an example of retransmission-related operations according to some aspects.

FIG. 10 is a signaling diagram 1000 illustrating an example of retransmission-related signaling in a wireless communication system including a network entity 1002 and a user equipment 1004. In some examples, the network entity 1002 may correspond to any of the network entities, base stations, CUs, DUs, RUs, or scheduling entities shown in any of FIGS. 1, 2, 3, 8, and 13. In some examples, the user equipment 1004 may correspond to any of the UEs or scheduled entities shown in any of FIGS. 1, 2, 3, 8, and 11.

At #1006 of FIG. 10, the network entity 1002 transmits (e.g., via RRC messaging) CORESET and SS configurations that the user equipment 1004 is to use for receiving information from the network entity 1002. For example, a CORESET configuration for the UE may specify the RBs and the number of symbols for each CORESET configured for the user equipment 1004. In addition, an SS configuration may specify, for each configured SS set, the associated CORESET, PDCCH candidates, and so on.

At #1008 of FIG. 10, the network entity 1002 transmits (e.g., via a DCI, a MAC-CE, or RRC messaging) reduced bandwidth parameters that the user equipment 1004 is to use for receiving retransmissions from the network entity 1002. For example, the reduced bandwidth parameters may include a mapping of ACK/NACK ratios (or other indications of how many code blocks (or other types of data units) passed CRC and/or how many code blocks (or other types of data units) failed CRC) to bandwidth reduction indications (e.g., reduction percentages, usage percentages) and to associated offsets (e.g., frequency offsets within a bandwidth, retransmission slot offsets, and so on). As discussed herein, the reduced bandwidth parameters may thereby specific a second PDCCH search space to be used for retransmissions, where the second PDCCH search space is different from a first PDCCH search space used for first transmissions.

At #1010, the user equipment 1004 repeatedly monitors the first search space to determine whether the network entity 1002 has transmitted any messages to the user equipment 1004. As discussed herein, this may involve blind decoding for PDCCH candidates in the first search space configured for the user equipment 1004.

At #1012, at some point in time, the network entity 1002 schedules a first PDSCH transmission for the user equipment 1004. As discussed herein, a DCI may be used to inform the user equipment 1004 of a scheduled transmission. Accordingly, at 1014, the network entity 1002 transmits a DCI to the user equipment 1004 via one or more PDCCH candidates, where the DCI indicates the scheduled first PDSCH transmission. In addition, at #1016, the network entity 1002 transmits the first PDSCH transmission to the user equipment 1004 on the scheduled resource. As mentioned above, in some examples, the network entity 1002 may transmit a DCI and a PDSCH in the same slot.

At #1018, the user equipment 1004 decodes the DCI and, at #1020, the user equipment 1004 decodes the PDSCH. As mentioned above, in some examples, during the reception of a slot that includes a DCI, the user equipment 1004 may decode the DCI and, based on the DCI information, decode the next PDSCH.

At #1022, the user equipment 1004 sends a HARQ-Ack to the network entity 1002 to indicate whether the user equipment 1004 successfully decoded the first PDSCH transmission.

In the event, the HARQ-Ack includes at least one NACK, at #1024, the user equipment 1004 monitors the second search space (e.g., a reduced search space) for the DCI associated with a retransmission by the network entity 1002. As discussed herein, this may involve blind decoding for PDCCH candidates in the second search space indicated by the reduced bandwidth parameters (e.g., dependent on the number of NACKs, or the NACK/ACK ratio, etc., sent at #1222). For example, the user equipment 1004 may monitor the second search space in the relevant slot within which the retransmission may appear (based on the delay between retransmissions). As there may be multiple independent HARQ processes (interleaved in time), some slots may be assigned to HARQ processes in the first transmission state and are therefore monitored with the first search space, while other slots may be assigned to the retransmission and are therefore searched with the reduced search space, based on the ACK/NACK ratio for the relevant HARQ process.

At #1026, the network entity 1002 schedules a retransmission associated with the first PDSCH transmission of #1118. In some examples, this retransmission is scheduled in a particular slot based on the slot offset (e.g., four slots) specified by the reduced bandwidth parameters. At 1028, the network entity 1002 transmits a DCI to the user equipment 1004 via one or more PDCCH candidates on the second search space, where the DCI indicates the scheduled retransmission. In addition, at #1030, the network entity 1002 transmits the retransmission to the user equipment 1004 on the reduced PDSCH bandwidth indicated by the reduced bandwidth parameters (e.g., dependent on the number of NACKs, or the NACK/ACK ratio, etc., sent at #1222).

At #1032, the user equipment 1004 decodes the DCI. Thus, the user equipment 1004 will identify the communication parameters (e.g., MCS, etc.) that the user equipment 1004 may use to receive the retransmission. At #1034, the user equipment 1004 decodes the retransmission.

At #1036, the user equipment 1004 sends a HARQ-Ack to the network entity 1002 to indicate whether the user equipment 1004 successfully decoded the retransmission.

The above operations may be applicable to a scenario where there are multiple retransmission. For example, the PDSCH transmission at #1016 could be a retransmission of an original PDSCH transmission.

Figure 11:
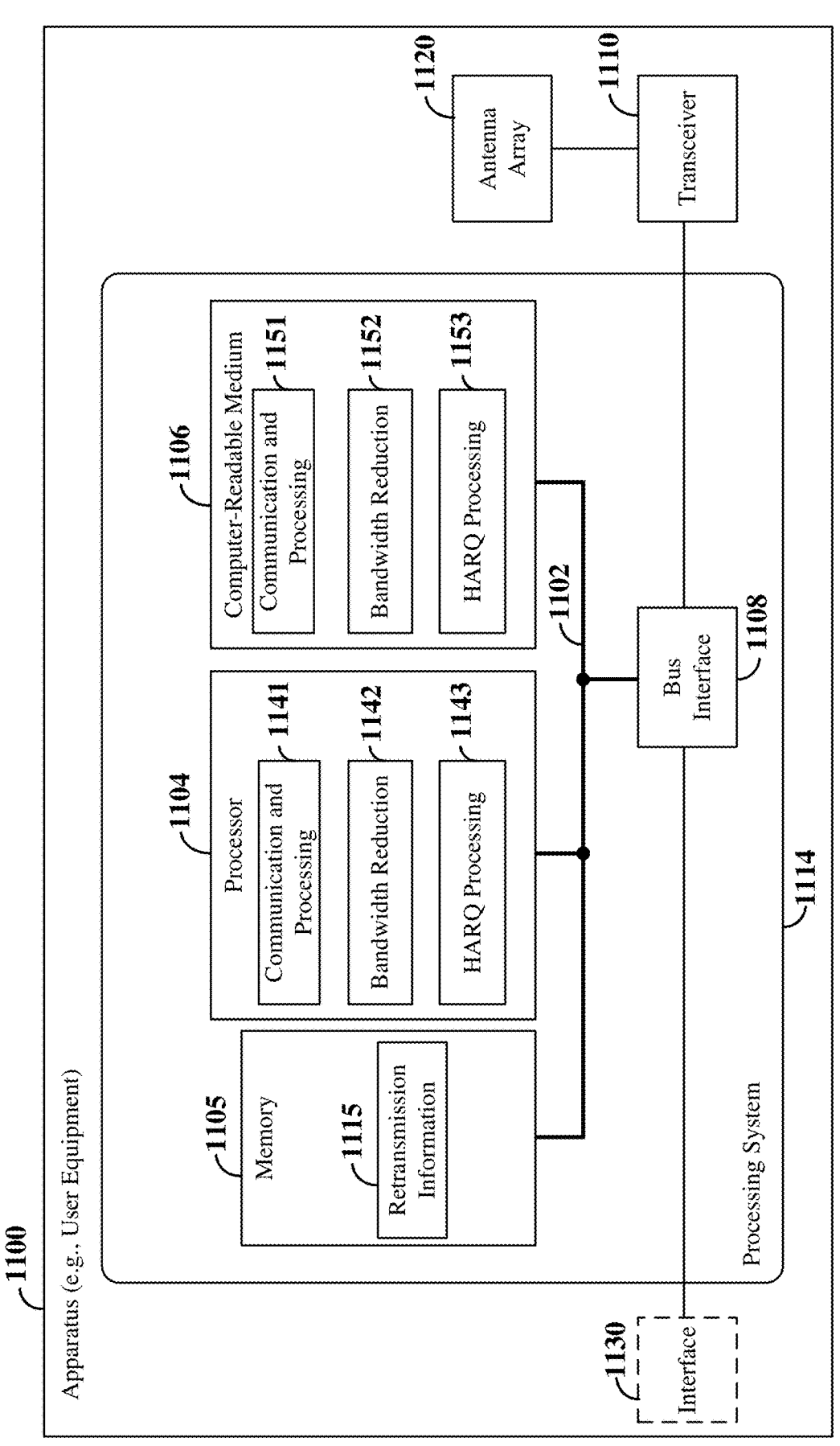
FIG. 11 is a block diagram conceptually illustrating an example of a hardware implementation for an apparatus (e.g., a user equipment) employing a processing system according to some aspects.

FIG. 11 is a block diagram illustrating an example of a hardware implementation for an apparatus 1100 employing a processing system 1114. For example, the apparatus 1100 may be a device configured to wirelessly communicate in a network as discussed in any one or more of FIGS. 1-10. In some implementations, the apparatus 1100 may correspond to any of the UEs or scheduled entities shown in any of FIGS. 1, 2, 3, 8, and 10.

In accordance with various aspects of the disclosure, an element, or any portion of an element, or any combination of elements may be implemented with the processing system 1114. The processing system 1114 may include one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the apparatus 1100 may be configured to perform any one or more of the functions described herein. That is, the processor 1104, as utilized in an apparatus 1100, may be used to implement any one or more of the processes and procedures described herein.

The processor 1104 may in some instances be implemented via a baseband or modem chip and in other implementations, the processor 1104 may include a number of devices distinct and different from a baseband or modem chip (e.g., in such scenarios as may work in concert to achieve the examples discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102, a transceiver 1110 and an antenna array 1120 and between the bus 1102 and an interface 1130. The transceiver 1110 provides a communication interface or means for communicating with various other apparatus over a wireless transmission medium. The interface 1130 provides a communication interface or means of communicating with various other apparatuses and devices (e.g., other devices housed within the same apparatus as the apparatus 1100 or other external apparatuses) over an internal bus or external transmission medium, such as an Ethernet cable. Depending upon the nature of the apparatus, the interface 1130 may include a user interface (e.g., keypad, display, speaker, microphone, joystick). Of course, such a user interface is optional, and may be omitted in some examples, such as an IoT device.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software. For example, the memory 1105 may store retransmission information 1115 (e.g., bandwidth reduction parameters) used by the processor 1104 for the communication operations described herein.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The apparatus 1100 may be configured to perform any one or more of the operations described herein (e.g., as described above in conjunction with FIGS. 1-10 and as described below in conjunction with FIG. 12). In some aspects of the disclosure, the processor 1104, as utilized in the apparatus 1100, may include circuitry configured for various functions.

In some aspects of the disclosure, the processor 1104 may include communication and processing circuitry 1141. The communication and processing circuitry 1141 may be configured to communicate with a user equipment. The communication and processing circuitry 1141 may include one or more hardware components that provide the physical structure that performs various processes related to communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. The communication and processing circuitry 1141 may further be configured to execute communication and processing software 1151 included on the computer-readable medium 1106 to implement one or more functions described herein.

The communication and processing circuitry 1141 may further be configured to output information to a network entity or another user equipment. For example, the information may be included in a MAC-CE carried in a Uu PUSCH or a PSCCH, or included in a Uu RRC message or an SL RRC message, or included in a dedicated Uu PUCCH or PUSCH. The communication and processing circuitry 1141 may further be configured to send a scheduling request to a network entity for an uplink grant or a sidelink grant.

In some implementations where the communication involves obtaining (e.g., receiving) information, the communication and processing circuitry 1141 may obtain information from a component of the apparatus 1100 (e.g., from the transceiver 1110 that receives the information via radio frequency signaling or some other type of signaling suitable for the applicable communication medium), process (e.g., decode) the information, and output the processed information. For example, the communication and processing circuitry 1141 may output the information to another component of the processor 1104, to the memory 1105, or to the bus interface 1108. In some examples, the communication and processing circuitry 1141 may receive one or more of signals, messages, other information, or any combination thereof. In some examples, the communication and processing circuitry 1141 may receive information via one or more channels. In some examples, the communication and processing circuitry 1141 may receive one or more of signals, messages, SCIs, feedback, other information, or any combination thereof. In some examples, the communication and processing circuitry 1141 may receive information via one or more of a PSCCH, a PSSCH, a PSFCH, some other type of channel, or any combination thereof. In some examples, the communication and processing circuitry 1141 and/or the transceiver 1110 may include functionality for a means for receiving. In some examples, the communication and processing circuitry 1141 may include functionality for a means for decoding. In some examples, the communication and processing circuitry 1141 and/or the transceiver 1110 may include functionality for a means for receiving (e.g., receiving information from a network entity).

In some implementations where the communication involves outputting (e.g., transmitting) information, the communication and processing circuitry 1141 may obtain information (e.g., from another component of the processor 1104, the memory 1105, or the bus interface 1108), process (e.g., encode) the information, and output the processed information. For example, the communication and processing circuitry 1141 may output the information to the transceiver 1110 (e.g., that transmits the information via radio frequency signaling or some other type of signaling suitable for the applicable communication medium). In some examples, the communication and processing circuitry 1141 may send one or more of signals, messages, other information, or any combination thereof. In some examples, the communication and processing circuitry 1141 may send information via one or more channels. In some examples, the communication and processing circuitry 1141 may send one or more of signals, messages, SCIs, feedback, other information, or any combination thereof. In some examples, the communication and processing circuitry 1141 may send information via one or more of a PSCCH, a PSSCH, a PSFCH, some other type of channel, or any combination thereof. In some examples, the communication and processing circuitry 1141 and/or the transceiver 1110 may include functionality for a means for transmitting. In some examples, the communication and processing circuitry 1141 may include functionality for a means for encoding. In some examples, the communication and processing circuitry 1141 and/or the transceiver 1110 may include functionality for a means for transmitting (e.g., transmitting information to a network entity).

The processor 1104 may include bandwidth reduction circuitry 1142 configured to perform bandwidth reduction-related operations as discussed herein (e.g., one or more of the operations described above in conjunction with FIGS. 8-10). The bandwidth reduction circuitry 1142 may be configured to execute bandwidth reduction software 1152 included on the computer-readable medium 1106 to implement one or more functions described herein.

The bandwidth reduction circuitry 1142 may include functionality for a means for obtaining information (e.g., as described above in conjunction with FIGS. 8-10). For example, the bandwidth reduction circuitry 1142 may receive, from a network entity, a MAC-CE, DCI, or an RRC message including first information indicative of bandwidth reduction rates for retransmissions.

The bandwidth reduction circuitry 1142 may include functionality for a means for selecting a bandwidth (e.g., as described above in conjunction with FIGS. 8-10). For example, the bandwidth reduction circuitry 1142 may select a second bandwidth for a retransmission associated with a first transmission based on received first information and transmitted first acknowledgement information.

The bandwidth reduction circuitry 1142 may include functionality for a means for identifying a slot offset (e.g., as described above in conjunction with FIGS. 8-10). For example, the bandwidth reduction circuitry 1142 may receive, from a network entity, a MAC-CE, DCI, or an RRC message including at least one slot offset to be used for retransmissions.

The processor 1104 may include HARQ processing circuitry 1143 configured to perform HARQ processing-related operations as discussed herein (e.g., one or more of the operations described above in conjunction with FIGS. 8-10). The HARQ processing circuitry 1143 may be configured to execute HARQ processing software 1153 included on the computer-readable medium 1106 to implement one or more functions described herein.

The HARQ processing circuitry 1143 may include functionality for a means for obtaining a transmission (e.g., as described above in conjunction with FIGS. 8-10). For example, the HARQ processing circuitry 1143 may receive a first PDSCH transmission (e.g., an original transmission) from a network entity. As another example, the HARQ processing circuitry 1143 may receive a retransmission associated with the first PDSCH transmission from a network entity.

The HARQ processing circuitry 1143 may include functionality for a means for monitoring a transmission (e.g., as described above in conjunction with FIGS. 8-10). For example, the HARQ processing circuitry 1143 may monitor a scheduled resource for a first PDSCH transmission from a network entity. As another example, the HARQ processing circuitry 1143 may monitor a scheduled resource for a retransmission associated with the first PDSCH transmission from a network entity.

The HARQ processing circuitry 1143 may include functionality for a means for outputting information (e.g., as described above in conjunction with FIGS. 8-10). For example, the HARQ processing circuitry 1143 may send first acknowledgement information to a network entity via UCI.

Figure 12:
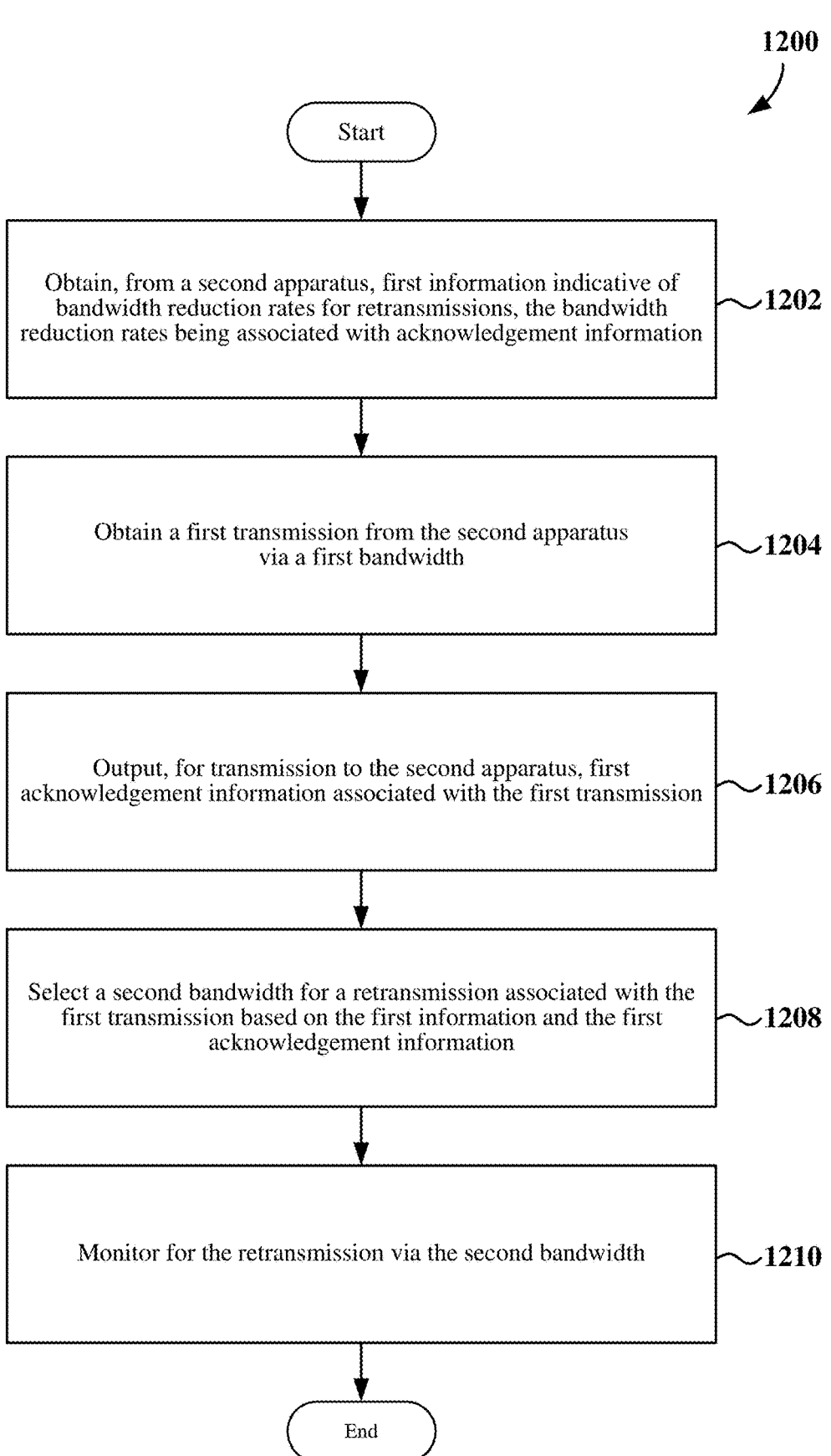
FIG. 12 is a flow chart illustrating an example communication method involving a retransmission according to some aspects.

FIG. 12 is a flow chart illustrating an example method 1200 for communication in accordance with some aspects of the present disclosure. As described below, some or all illustrated features may be omitted in a particular implementation within the scope of the present disclosure, and some illustrated features may not be required for implementation of all examples. In some examples, the method 1200 may be carried out by the apparatus 1100 illustrated in FIG. 11. In some examples, the method 1200 may be carried out by the apparatus 1500 or 1502 illustrated in FIG. 15. In some examples, the method 1200 may be carried out by any suitable apparatus or means for carrying out the functions or algorithm described below.

At block 1202, the first apparatus may obtain, from a second apparatus, first information indicative of bandwidth reduction rates for retransmissions, the bandwidth reduction rates being associated with acknowledgement information. In some examples, the bandwidth reduction circuitry 1142, shown and described in FIG. 11, may provide a means to obtain, from a second apparatus, first information indicative of bandwidth reduction rates for retransmissions, the bandwidth reduction rates being associated with acknowledgement information. In some examples, the bandwidth reduction circuitry 1142 together with the communication and processing circuitry 1141 and the transceiver 1110, shown and described in FIG. 11, may provide a means to obtain, from a second apparatus, first information indicative of bandwidth reduction rates for retransmissions, the bandwidth reduction rates being associated with acknowledgement information. In some examples, the communication and processing circuitry 1141 and/or the transceiver 1110, shown and described in FIG. 11, may provide a means to obtain, from a second apparatus, first information indicative of bandwidth reduction rates for retransmissions, the bandwidth reduction rates being associated with acknowledgement information.

At block 1204, the first apparatus may obtain a first transmission from the second apparatus via a first bandwidth. In some examples, the HARQ processing circuitry 1143, shown and described in FIG. 11, may provide a means to obtain a first transmission from the second apparatus via a first bandwidth. In some examples, the HARQ processing circuitry 1143 together with the communication and processing circuitry 1141 and the transceiver 1110, shown and described in FIG. 11, may provide a means to obtain a first transmission from the second apparatus via a first bandwidth. In some examples, the communication and processing circuitry 1141 and/or the transceiver 1110, shown and described in FIG. 11, may provide a means to obtain a first transmission from the second apparatus via a first bandwidth.

At block 1206, the first apparatus may output, for transmission to the second apparatus, first acknowledgement information associated with the first transmission. In some examples, the HARQ processing circuitry 1143, shown and described in FIG. 11, may provide a means to output, for transmission to the second apparatus, first acknowledgement information associated with the first transmission. In some examples, the HARQ processing circuitry 1143 together with the communication and processing circuitry 1141 and the transceiver 1110, shown and described in FIG. 11, may provide a means to output, for transmission to the second apparatus, first acknowledgement information associated with the first transmission. In some examples, the communication and processing circuitry 1141 and/or the transceiver 1110, shown and described in FIG. 11, may provide a means to output, for transmission to the second apparatus, first acknowledgement information associated with the first transmission.

At block 1208, the first apparatus may select a second bandwidth for a retransmission associated with the first transmission based on the first information and the first acknowledgement information. In some examples, the bandwidth reduction circuitry 1142, shown and described in FIG. 11, may provide a means to select a second bandwidth for a retransmission associated with the first transmission based on the first information and the first acknowledgement information.

At block 1210, the first apparatus may monitor for the retransmission via the second bandwidth. In some examples, the HARQ processing circuitry 1143, shown and described in FIG. 11, may provide a means to monitor for the retransmission via the second bandwidth. In some examples, the HARQ processing circuitry 1143 together with the communication and processing circuitry 1141 and the transceiver 1110, shown and described in FIG. 11, may provide a means to monitor for the retransmission via the second bandwidth. In some examples, the communication and processing circuitry 1141 and/or the transceiver 1110, shown and described in FIG. 11, may provide a means to monitor for the retransmission via the second bandwidth.

In some examples, the first bandwidth is associated with a first physical downlink shared channel resource allocation. In some examples, the second bandwidth is associated with a second physical downlink shared channel resource allocation. In some examples, the second bandwidth is different from the first bandwidth.

In some examples, the first bandwidth is associated with a first physical downlink control channel search space. In some examples, the second bandwidth is associated with a second physical downlink control channel search space. In some examples, the second physical downlink control channel search space is different from the first physical downlink control channel search space.

In some examples, the first acknowledgement information indicates a NACK/ACK ratio associated with the first transmission. In some examples, the first information maps a first bandwidth reduction to a first NACK/ACK ratio. In some examples, the first information maps a second bandwidth reduction to a second NACK/ACK ratio. In some examples, the first bandwidth reduction is different from the second bandwidth reduction. In some examples, the first NACK/ACK ratio is different from the second NACK/ACK ratio. In some examples, the selection of the second bandwidth comprises selecting the first bandwidth reduction based on a comparison of the first acknowledgement information with the first NACK/ACK ratio.

In some examples, the first bandwidth reduction is associated with at least one of a first physical downlink shared channel resource allocation, or a first physical downlink control channel search space. In some examples, the second bandwidth reduction is associated with at least one of a second physical downlink shared channel resource allocation, or a second physical downlink control channel search space.

In some examples, the first bandwidth reduction indicates a first percentage of the first bandwidth. In some examples, the second bandwidth reduction indicates a second percentage of the first bandwidth. In some examples, the first percentage is different from the second percentage.

In some examples, the first information indicates a location of the second bandwidth within the first bandwidth. In some examples, the first information indicates a frequency offset of the second bandwidth. In some examples, the first information indicates a first slot offset between the first transmission and the retransmission. In some examples, the first information indicates a second slot offset between the retransmission and another retransmission of the first transmission.

In some examples, the selection of the second bandwidth may include identifying, based on the first information, a first bandwidth reduction that maps to the first acknowledgement information. In some examples, the selection of the second bandwidth may include identifying, based on the first information, a first bandwidth offset that maps to the first acknowledgement information.

In some examples, the first apparatus may identify, based on the first information, a slot offset that maps to the first acknowledgement information.

In some examples, the first information is obtained via downlink control information, a medium access control-control element (MAC-CE), or a radio resource control (RRC) message.

In some examples, the first apparatus includes a transceiver configured to transmit the first acknowledgement information, and receive the first information, the first transmission and the retransmission, wherein the first apparatus is configured as a user equipment.

Referring again to FIG. 11, in one configuration, the apparatus 1100 includes means for obtaining, from a second apparatus, first information indicative of bandwidth reduction rates for retransmissions, the bandwidth reduction rates being associated with acknowledgement information, means for obtaining a first transmission from the second apparatus via a first bandwidth, means for outputting, for transmission to the second apparatus, first acknowledgement information associated with the first transmission, means for selecting a second bandwidth for a retransmission associated with the first transmission based on the first information and the first acknowledgement information, and means for monitoring for the retransmission via the second bandwidth. In one aspect, the aforementioned means may be the processor 1104 shown in FIG. 11 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1104 is merely provided as an example, and other means for carrying out the described functions may be included within various aspects of the present disclosure, including but not limited to the instructions stored in the computer-readable medium 1106, or any other suitable apparatus or means described in any one or more of FIGS. 1, 2, 3, 8, and 10, and 11 and utilizing, for example, the methods and/or algorithms described herein in relation to FIG. 12.

Figure 13:
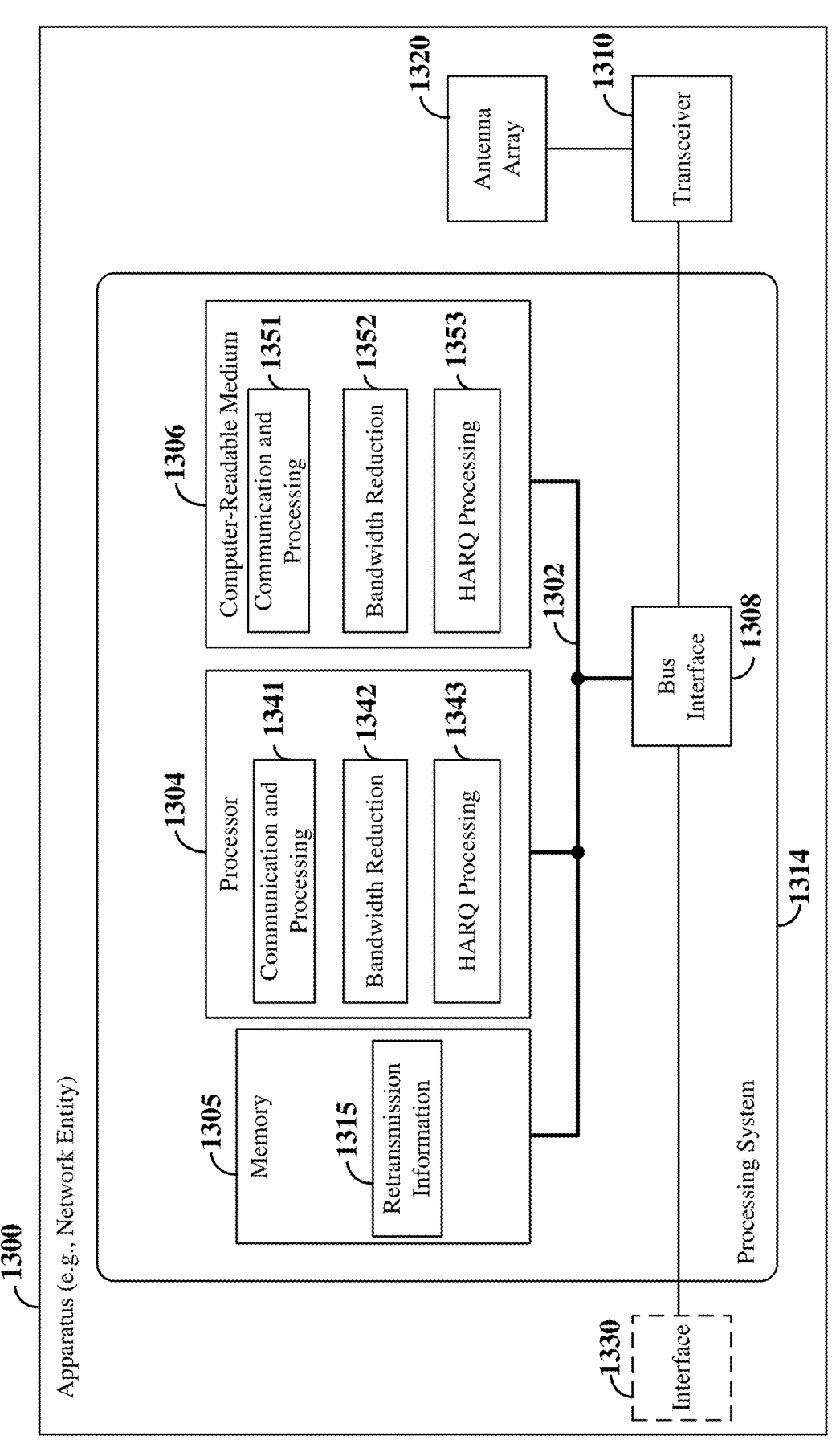
FIG. 13 is a block diagram conceptually illustrating an example of a hardware implementation for an apparatus (e.g., a network entity) employing a processing system according to some aspects.

FIG. 13 is a conceptual diagram illustrating an example of a hardware implementation for an apparatus 1300 employing a processing system 1314. In some implementations, the apparatus 1300 may correspond to any of the network entities, CUs, DUs, RUs, base stations, or scheduling entities shown in any of FIGS. 1, 2, 3, 8, and 10.

In accordance with various aspects of the disclosure, an element, or any portion of an element, or any combination of elements may be implemented with the processing system 1314. The processing system may include one or more processors 1304. The processing system 1314 may be substantially the same as the processing system 1114 illustrated in FIG. 11, including a bus interface 1308, a bus 1302, memory 1305, a processor 1304, a computer-readable medium 1306, a transceiver 1310, and an antenna array 1320. The memory 1305 may store retransmission information 1315 (e.g., bandwidth reduction parameters) used by the processor 1304 in cooperation with the transceiver 1310 for communication operations as described herein. Furthermore, the apparatus 1300 may include an interface 1330 (e.g., a network interface) that provides a means for communicating with at least one other apparatus within a core network and with at least one radio access network.

The apparatus 1300 may be configured to perform any one or more of the operations described herein (e.g., as described above in conjunction with FIGS. 1-10 and as described below in conjunction with FIG. 14). In some aspects of the disclosure, the processor 1304, as utilized in the apparatus 1300, may include circuitry configured for various functions.

The processor 1304 may be configured to generate, schedule, and modify a resource assignment or grant of time-frequency resources (e.g., a set of one or more resource elements). For example, the processor 1304 may schedule time—frequency resources within a plurality of time division duplex (TDD) and/or frequency division duplex (FDD) subframes, slots, and/or mini-slots to carry user data traffic and/or control information to and/or from multiple scheduled entities. The processor 1304 may be configured to schedule resources for the transmission of downlink signals. The processor 1304 may further be configured to schedule resources for the transmission of uplink signals.

In some aspects of the disclosure, the processor 1304 may include communication and processing circuitry 1341. The communication and processing circuitry 1341 may be configured to communicate with user equipment. The communication and processing circuitry 1341 may include one or more hardware components that provide the physical structure that performs various processes related to communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. The communication and processing circuitry 1341 may further be configured to execute communication and processing software 1351 included on the computer-readable medium 1306 to implement one or more functions described herein.

The communication and processing circuitry 1141 may further be configured to receive information from a UE. For example, the information may be included in a MAC-CE carried in a Uu PUSCH, or included in a Uu RRC message, or included in a dedicated Uu PUCCH or PUSCH. The communication and processing circuitry 1141 may further be configured to receive a scheduling request from a UE for an uplink grant or a sidelink grant.

In some implementations wherein the communication involves obtaining (e.g., receiving) information, the communication and processing circuitry 1341 may obtain information from a component of the apparatus 1300 (e.g., from the transceiver 1310 that receives the information via radio frequency signaling or some other type of signaling suitable for the applicable communication medium), process (e.g., decode) the information, and output the processed information. For example, the communication and processing circuitry 1341 may output the information to another component of the processor 1304, to the memory 1305, or to the bus interface 1308. In some examples, the communication and processing circuitry 1341 may receive one or more of signals, messages, other information, or any combination thereof. In some examples, the communication and processing circuitry 1341 may receive information via one or more channels. In some examples, the communication and processing circuitry 1341 and/or the transceiver 1310 may include functionality for a means for receiving. In some examples, the communication and processing circuitry 1341 may include functionality for a means for decoding. In some examples, the communication and processing circuitry 1341 and/or the transceiver 1310 may include functionality for a means for receiving (e.g., receiving information from a UE).

In some implementations wherein the communication involves outputting (e.g., transmitting) information, the communication and processing circuitry 1341 may obtain information (e.g., from another component of the processor 1304, the memory 1305, or the bus interface 1308), process (e.g., encode) the information, and output the processed information. For example, the communication and processing circuitry 1341 may output the information to the transceiver 1310 (e.g., that transmits the information via radio frequency signaling or some other type of signaling suitable for the applicable communication medium). In some examples, the communication and processing circuitry 1341 may send one or more of signals, messages, other information, or any combination thereof. In some examples, the communication and processing circuitry 1341 may send information via one or more channels. In some examples, the communication and processing circuitry 1341 and/or the transceiver 1310 may include functionality for a means for transmitting. In some examples, the communication and processing circuitry 1341 may include functionality for a means for encoding. In some examples, the communication and processing circuitry 1341 and/or the transceiver 1310 may include functionality for a means for transmitting (e.g., transmitting information to a UE).

The processor 1304 may include bandwidth reduction circuitry 1342 configured to perform bandwidth reduction-related operations as discussed herein (e.g., one or more of the operations described above in conjunction with FIGS. 8-10). The bandwidth reduction circuitry 1342 may be configured to execute bandwidth reduction software 1352 included on the computer-readable medium 1306 to implement one or more functions described herein.

The bandwidth reduction circuitry 1342 may include functionality for a means for outputting information (e.g., as described above in conjunction with FIGS. 8-10). For example, the bandwidth reduction circuitry 1342 may send to a UE a MAC-CE, DCI, or an RRC message that includes first information indicative of bandwidth reduction rates for retransmissions.

The bandwidth reduction circuitry 1342 may include functionality for a means for selecting a bandwidth (e.g., as described above in conjunction with FIGS. 8-10). For example, the bandwidth reduction circuitry 1342 may select a second bandwidth for a retransmission associated with a first transmission based on transmitted first information and received first acknowledgement information.

The bandwidth reduction circuitry 1342 may include functionality for a means for including a slot offset (e.g., as described above in conjunction with FIGS. 8-10). For example, the bandwidth reduction circuitry 1342 may include, in a MAC-CE, DCI, or an RRC message, information that specifies at least one slot offset to be used for retransmissions.

The processor 1304 may include HARQ processing circuitry 1343 configured to perform HARQ processing-related operations as discussed herein (e.g., one or more of the operations described above in conjunction with FIGS. 8-10). The HARQ processing circuitry 1343 may be configured to execute HARQ processing software 1353 included on the computer-readable medium 1306 to implement one or more functions described herein.

The HARQ processing circuitry 1343 may include functionality for a means for outputting a transmission (e.g., as described above in conjunction with FIGS. 8-10). For example, the HARQ processing circuitry 1343 may output a first PDSCH transmission (e.g., an original transmission) to a UE. As another example, the HARQ processing circuitry 1343 may output a retransmission associated with the first PDSCH transmission to a UE.

The HARQ processing circuitry 1343 may include functionality for a means for obtaining information (e.g., as described above in conjunction with FIGS. 8-10). For example, the HARQ processing circuitry 1343 may receive first acknowledgement information from a UE via UCI.

In some examples, the apparatus 1300 shown and described above in connection with FIG. 13 may be a disaggregated base station. For example, the apparatus 1300 shown in FIG. 13 may include the CU and optionally one or more DUs/RUs of the disaggregated base station. Other DUs/RUs associated with the apparatus 1300 may be distributed throughout the network. In some examples, the DUs/RUs may correspond to TRPs associated with the network entity. In some examples, the CU and/or DU/RU of the disaggregated base station (e.g., within the apparatus 1300) may generate bandwidth reduction rate information and provide this information to a user equipment.

FIG. 14 is a flow chart illustrating an example method 1400 for communication in accordance with some aspects of the present disclosure. As described below, some or all illustrated features may be omitted in a particular implementation within the scope of the present disclosure, and some illustrated features may not be required for implementation of all examples. In some examples, the method 1400 may be carried out by the apparatus 1300 illustrated in FIG. 13. In some examples, the method 1400 may be carried out by the apparatus 1500 or 1502 illustrated in FIG. 15. In some examples, the method 1400 may be carried out by any suitable apparatus or means for carrying out the functions or algorithm described below.

At block 1402, the first apparatus may output, for transmission to a second apparatus, first information indicative of bandwidth reduction rates for retransmissions, the bandwidth reduction rates being associated with acknowledgement information. In some examples, the bandwidth reduction circuitry 1342, shown and described in FIG. 13, may provide a means to output, for transmission to a second apparatus, first information indicative of bandwidth reduction rates for retransmissions, the bandwidth reduction rates being associated with acknowledgement information. In some examples, the bandwidth reduction circuitry 1342 together with the communication and processing circuitry 1341 and the transceiver 1310, shown and described in FIG. 13, may provide a means to output, for transmission to a second apparatus, first information indicative of bandwidth reduction rates for retransmissions, the bandwidth reduction rates being associated with acknowledgement information. In some examples, the communication and processing circuitry 1341 and/or the transceiver 1310, shown and described in FIG. 13, may provide a means to output, for transmission to a second apparatus, first information indicative of bandwidth reduction rates for retransmissions, the bandwidth reduction rates being associated with acknowledgement information.

At block 1404, the first apparatus may output, for transmission to the second apparatus via a first bandwidth, a first transmission. In some examples, the HARQ processing circuitry 1343, shown and described in FIG. 13, may provide a means to output, for transmission to the second apparatus via a first bandwidth, a first transmission. In some examples, the HARQ processing circuitry 1343 together with the communication and processing circuitry 1341 and the transceiver 1310, shown and described in FIG. 13, may provide a means to output, for transmission to the second apparatus via a first bandwidth, a first transmission. In some examples, the communication and processing circuitry 1341 and/or the transceiver 1310, shown and described in FIG. 13, may provide a means to output, for transmission to the second apparatus via a first bandwidth, a first transmission.

At block 1406, the first apparatus may obtain, from the second apparatus, first acknowledgement information associated with the first transmission. In some examples, the HARQ processing circuitry 1343, shown and described in FIG. 13, may provide a means to obtain, from the second apparatus, first acknowledgement information associated with the first transmission. In some examples, the HARQ processing circuitry 1343 together with the communication and processing circuitry 1341 and the transceiver 1310, shown and described in FIG. 13, may provide a means to obtain, from the second apparatus, first acknowledgement information associated with the first transmission. In some examples, the communication and processing circuitry 1341 and/or the transceiver 1310, shown and described in FIG. 13, may provide a means to obtain, from the second apparatus, first acknowledgement information associated with the first transmission.

At block 1408, the first apparatus may select a second bandwidth for a retransmission associated with the first transmission based on the first information and the first acknowledgement information. In some examples, the bandwidth reduction circuitry 1342, shown and described in FIG. 13, may provide a means to select a second bandwidth for a retransmission associated with the first transmission based on the first information and the first acknowledgement information.

At block 1410, the first apparatus may output, for transmission to the second apparatus via the second bandwidth, the retransmission. In some examples, the HARQ processing circuitry 1343, shown and described in FIG. 13, may provide a means to output, for transmission to the second apparatus via the second bandwidth, the retransmission. In some examples, the HARQ processing circuitry 1343 together with the communication and processing circuitry 1341 and the transceiver 1310, shown and described in FIG. 13, may provide a means to output, for transmission to the second apparatus via the second bandwidth, the retransmission. In some examples, the communication and processing circuitry 1341 and/or the transceiver 1310, shown and described in FIG. 13, may provide a means to output, for transmission to the second apparatus via the second bandwidth, the retransmission.

In some examples, the first bandwidth is associated with a first physical downlink shared channel resource allocation. In some examples, the second bandwidth is associated with a second physical downlink shared channel resource allocation. In some examples, the second bandwidth is different from the first bandwidth.

In some examples, the first bandwidth is associated with a first physical downlink control channel search space. In some examples, the second bandwidth is associated with a second physical downlink control channel search space. In some examples, the second physical downlink control channel search space is different from the first physical downlink control channel search space.

In some examples, the first acknowledgement information indicates a NACK/ACK ratio associated with the first transmission. In some examples, the first information maps a first bandwidth reduction to a first NACK/ACK ratio. In some examples, the first information maps a second bandwidth reduction to a second NACK/ACK ratio. In some examples, the first bandwidth reduction is different from the second bandwidth reduction. In some examples, the first NACK/ACK ratio is different from the second NACK/ACK ratio. In some examples, the selection of the second bandwidth may include selecting the first bandwidth reduction based on a comparison of the first acknowledgement information with the first NACK/ACK ratio.

In some examples, the first bandwidth reduction is associated with at least one of a first physical downlink shared channel resource allocation, or a first physical downlink control channel search space. In some examples, the second bandwidth reduction is associated with at least one of a second physical downlink shared channel resource allocation, or a second physical downlink control channel search space.

In some examples, the first bandwidth reduction indicates a first percentage of the first bandwidth. In some examples, the second bandwidth reduction indicates a second percentage of the first bandwidth. In some examples, the first percentage is different from the second percentage.

In some examples, the first information indicates a location of the second bandwidth within the first bandwidth. In some examples, the first information indicates a frequency offset of the second bandwidth. In some examples, the first information indicates a first slot offset between the first transmission and the retransmission. In some examples, the first information indicates a second slot offset between the retransmission and another retransmission of the first transmission.

In some examples, the selection of the second bandwidth may include identifying, based on the first information, a first bandwidth reduction that maps to the first acknowledgement information. In some examples, the selection of the second bandwidth may include identifying, based on the first information, a first bandwidth offset that maps to the first acknowledgement information.

In some examples, the first apparatus may include, in the first information, a slot offset that maps to the first acknowledgement information.

In some examples, the first information is output for transmission via downlink control information, a medium access control-control element (MAC-CE), or a radio resource control (RRC) message.

In some examples, the first apparatus may include a transceiver configured to receive the first acknowledgment information, and transmit the first information, the first transmission and the retransmission, wherein the first apparatus is configured as a network entity.

Referring again to FIG. 13, in one configuration, the apparatus 1300 includes means for outputting, for transmission to a second apparatus, first information indicative of bandwidth reduction rates for retransmissions, the bandwidth reduction rates being associated with acknowledgement information, means for outputting, for transmission to the second apparatus via a first bandwidth, a first transmission, means for obtaining, from the second apparatus, first acknowledgement information associated with the first transmission, means for selecting a second bandwidth for a retransmission associated with the first transmission based on the first information and the first acknowledgement information, and means for outputting, for transmission to the second apparatus via the second bandwidth, the retransmission. In one aspect, the aforementioned means may be the processor 1304 shown in FIG. 13 configured to perform the functions recited by the aforementioned means (e.g., as discussed above). In another aspect, the aforementioned means may be a circuit or any apparatus configured to perform the functions recited by the aforementioned means.

Of course, in the above examples, the circuitry included in the processor 1304 is merely provided as an example, and other means for carrying out the described functions may be included within various aspects of the present disclosure, including but not limited to the instructions stored in the computer-readable medium 1306, or any other suitable apparatus or means described in any one or more of FIGS.

1, 2, 3, 8, and 10, and 13 and utilizing, for example, the methods and/or algorithms described herein in relation to FIG. 14.

Figure 15:
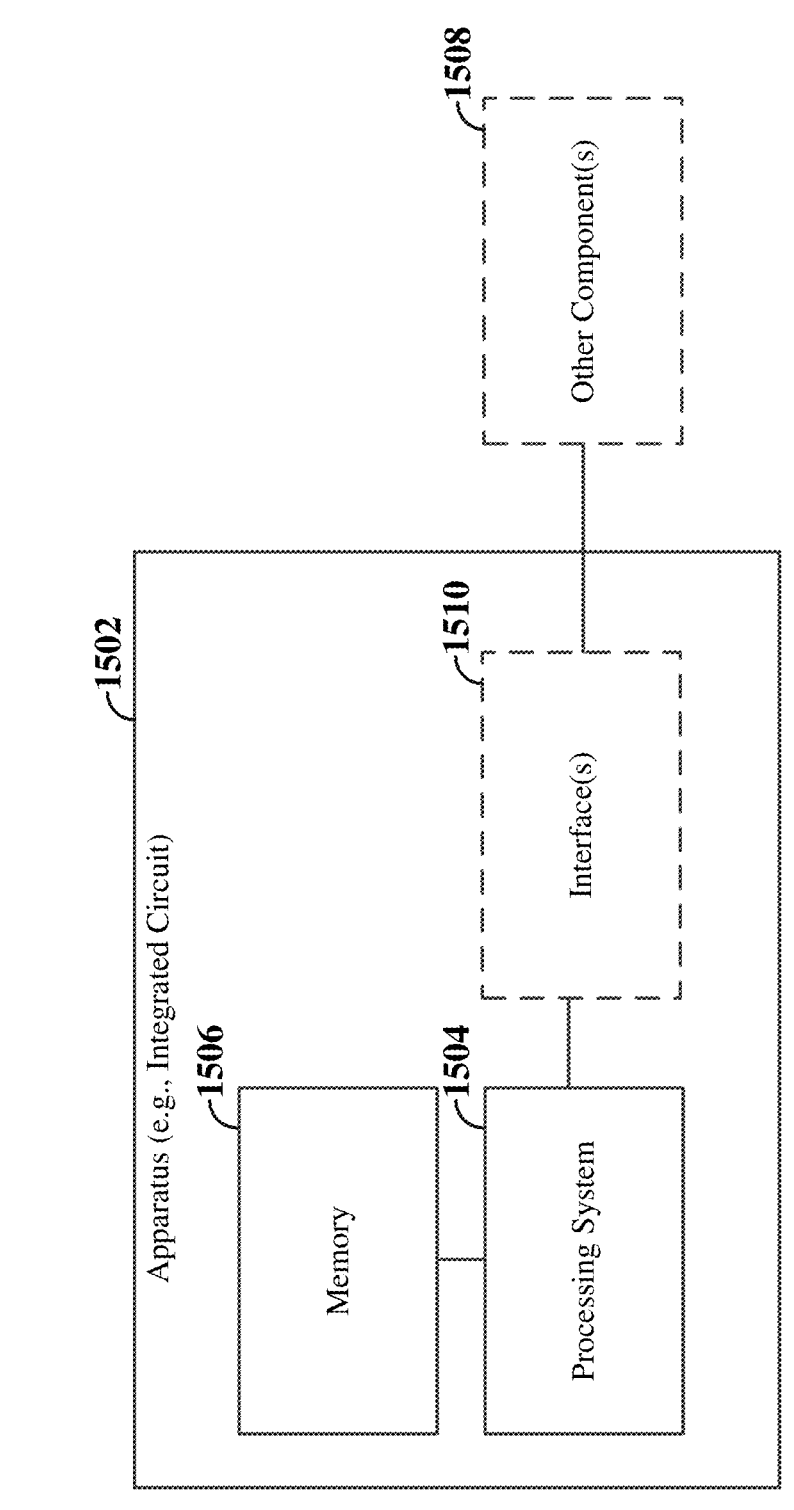
FIG. 15 is a schematic illustration of an example of an apparatus for communication according to some aspects.

FIG. 15 illustrates an example apparatus 1500 according to certain aspects of the disclosure. In some examples, the apparatus 1500 may be a network entity, a UE, or some other type of wireless node (e.g., a node that utilizes wireless spectrum (e.g., the RF spectrum) to communicate with another node or entity). In some examples, the apparatus 1500 may correspond to any of the apparatuses, UEs, scheduled entities, network entities, base stations (e.g., gNBs), scheduling entities, distributed units, control units, RAN nodes, or CN entities shown in any of FIGS. 1, 2, 3, 8, 10, 11, and 13.

The apparatus 1500 includes an apparatus 1502 (e.g., an integrated circuit) and, optionally, at least one other component 1508. In some aspects, the apparatus 1502 may be configured to operate in a wireless communication device (e.g., a UE, a BS, etc.) and to perform one or more of the operations described herein. The apparatus 1502 includes a processing system 1504, and a memory 1506 coupled to the processing system 1504. Example implementations of the processing system 1504 are provided herein. In some examples, the processing system 1504 of FIG. 15 may correspond to the processing system 1114 of FIG. 11. In some examples, the processing system 1504 of FIG. 15 may correspond to the processing system 1314 of FIG. 13.

The processing system 1504 is generally adapted for processing, including the execution of such programming stored on the memory 1506. For example, the memory 1506 may store instructions that, when executed by the processing system 1504, cause the processing system 1504 to perform one or more of the operations described herein.

In some implementations, the apparatus 1502 communicates with at least one other component (e.g., a component 1508 external to the apparatus 1502) of the apparatus 1500. To this end, in some implementations, the apparatus 1502 may include at least one interface 1510 (e.g., a send and/or receive interface) coupled to and/or included in the processing system 1504 for outputting and/or obtaining (e.g., sending and/or receiving) information (e.g., received information, generated information, decoded information, messages, etc.) between the processing system 1504 and the other component(s) 1508 and/or some other component (not shown). In some implementations, an interface 1510 may include an interface bus, bus drivers, bus receivers, buffers, other suitable circuitry, or a combination thereof. In some implementations, an interface 1510 may include radio frequency (RF) circuitry (e.g., an RF transmitter and/or an RF receiver). In some implementations, an interface 1510 may be configured to interface the apparatus 1502 to one or more other components of the apparatus 1500 (other components not shown in FIG. 15). For example, an interface 1510 may be configured to interface the processing system 1504 to a radio frequency (RF) front end (e.g., an RF transmitter and/or an RF receiver).

The apparatus 1502 may communicate with other apparatuses in various ways. In cases where the apparatus 1502 includes an RF transceiver (not specifically depicted in FIG. 15), the apparatus may transmit and receive information (e.g., a frame, a message, bits, etc.) via RF signaling. In some cases, rather than transmitting information via RF signaling, the apparatus 1502 may have an interface to provide (e.g., output, send, transmit, etc.) information for RF transmission. For example, the processing system 1504 may output information, via a bus interface, to an RF front end for RF transmission. Similarly, rather than receiving information via RF signaling, the apparatus 1502 may have an interface to obtain information that is received by another apparatus. For example, the processing system 1504 may obtain (e.g., receive) information, via a bus interface, from an RF receiver that received the information via RF signaling. In some implementations, an interface may include multiple interfaces. For example, a bidirectional interface may include a first interface for obtaining and a second interface for outputting.

The methods shown in FIGS. 12 and 14 may include additional aspects, such as any single aspect or any combination of aspects described below and/or in connection with one or more other processes described elsewhere herein. The following provides an overview of several aspects of the present disclosure.

Aspect 1: A method for communication at a first apparatus (e.g., a user equipment), the method comprising: obtaining, from a second apparatus, first information indicative of bandwidth reduction rates for retransmissions, the bandwidth reduction rates being associated with acknowledgement information; obtaining a first transmission from the second apparatus via a first bandwidth; outputting, for transmission to the second apparatus, first acknowledgement information associated with the first transmission; selecting a second bandwidth for a retransmission associated with the first transmission based on the first information and the first acknowledgement information; and monitoring for the retransmission via the second bandwidth.

Aspect 2: The method of aspect 1, wherein at least one of: the first bandwidth is associated with a first physical downlink shared channel resource allocation; or the second bandwidth is associated with a second physical downlink shared channel resource allocation.

Aspect 3: The method of any of aspects 1 through 2, wherein at least one of: the first bandwidth is associated with a first physical downlink control channel search space; or the second bandwidth is associated with a second physical downlink control channel search space.

Aspect 4: The method of any of aspects 1 through 3, wherein: the first information maps a first bandwidth reduction to a first NACK/ACK ratio; the first information maps a second bandwidth reduction to a second NACK/ACK ratio; the first bandwidth reduction is different from the second bandwidth reduction; the first NACK/ACK ratio is different from the second NACK/ACK ratio; and the selection of the second bandwidth comprises selecting the first bandwidth reduction based on a comparison of the first acknowledgement information with the first NACK/ACK ratio.

Aspect 5: The method of aspect 4, wherein at least one of: the first bandwidth reduction is associated with at least one of: a first physical downlink shared channel resource allocation, or a first physical downlink control channel search space; or the second bandwidth reduction is associated with at least one of: a second physical downlink shared channel resource allocation, or a second physical downlink control channel search space.

Aspect 6: The method of any of aspects 4 through 5, wherein: the first bandwidth reduction indicates a first percentage of the first bandwidth; the second bandwidth reduction indicates a second percentage of the first bandwidth; and the first percentage is different from the second percentage.

Aspect 7: The method of any of aspects 1 through 6, wherein the first acknowledgement information indicates a NACK/ACK ratio associated with the first transmission.

Aspect 8: The method of any of aspects 1 through 7, wherein the first information indicates a location of the second bandwidth within the first bandwidth.

Aspect 9: The method of any of aspects 1 through 8, wherein the first information indicates a frequency offset of the second bandwidth.

Aspect 10: The method of any of aspects 1 through 9, wherein: the first information indicates a first slot offset between the first transmission and the retransmission; or the first information indicates a second slot offset between the retransmission and another retransmission of the first transmission.

Aspect 11: The method of any of aspects 1 through 10, wherein the selection of the second bandwidth comprises identifying, based on the first information, a first bandwidth reduction that maps to the first acknowledgement information.

Aspect 12: The method of any of aspects 1 through 11, wherein the selection of the second bandwidth comprises identifying, based on the first information, a first bandwidth offset that maps to the first acknowledgement information.

Aspect 13: The method of any of aspects 1 through 12, further comprising: identifying, based on the first information, a slot offset that maps to the first acknowledgement information.

Aspect 14: The method of any of aspects 1 through 13, wherein the first information is obtained via downlink control information, a medium access control-control element (MAC-CE), or a radio resource control (RRC) message.

Aspect 16: A method for communication at a first apparatus (e.g., a network entity), the method comprising: outputting, for transmission to a second apparatus, first information indicative of bandwidth reduction rates for retransmissions, the bandwidth reduction rates being associated with acknowledgement information; outputting, for transmission to the second apparatus via a first bandwidth, a first transmission; obtaining, from the second apparatus, first acknowledgement information associated with the first transmission; selecting a second bandwidth for a retransmission associated with the first transmission based on the first information and the first acknowledgement information; and outputting, for transmission to the second apparatus via the second bandwidth, the retransmission.

Aspect 17: The method of aspect 16, wherein at least one of: the first bandwidth is associated with a first physical downlink shared channel resource allocation; or the second bandwidth is associated with a second physical downlink shared channel resource allocation.

Aspect 18: The method of any of aspects 16 through 17, wherein at least one of: the first bandwidth is associated with a first physical downlink control channel search space; or the second bandwidth is associated with a second physical downlink control channel search space.

Aspect 19: The method of any of aspects 16 through 18, wherein: the first information maps a first bandwidth reduction to a first NACK/ACK ratio; the first information maps a second bandwidth reduction to a second NACK/ACK ratio; the first bandwidth reduction is different from the second bandwidth reduction; the first NACK/ACK ratio is different from the second NACK/ACK ratio; and the selection of the second bandwidth comprises selecting the first bandwidth reduction based on a comparison of the first acknowledgement information with the first NACK/ACK ratio.

Aspect 20: The method aspect 19, wherein at least one of: the first bandwidth reduction is associated with at least one of: a first physical downlink shared channel resource allocation, or a first physical downlink control channel search space; or the second bandwidth reduction is associated with at least one of: a second physical downlink shared channel resource allocation, or a second physical downlink control channel search space.

Aspect 21: The method of aspects 19 through 20, wherein: the first bandwidth reduction indicates a first percentage of the first bandwidth; the second bandwidth reduction indicates a second percentage of the first bandwidth; and the first percentage is different from the second percentage.

Aspect 22: The method of any of aspects 16 through 21, wherein the first acknowledgement information indicates a NACK/ACK ratio associated with the first transmission.

Aspect 23: The method of any of aspects 16 through 22, wherein the first information indicates a location of the second bandwidth within the first bandwidth.

Aspect 24: The method of any of aspects 16 through 23, wherein the first information indicates a frequency offset of the second bandwidth.

Aspect 25: The method of any of aspects 16 through 24, wherein: the first information indicates a first slot offset between the first transmission and the retransmission; or the first information indicates a second slot offset between the retransmission and another retransmission of the first transmission.

Aspect 26: The method of any of aspects 16 through 25, wherein the selection of the second bandwidth comprises identifying, based on the first information, a first bandwidth reduction that maps to the first acknowledgement information.

Aspect 27: The method of any of aspects 16 through 26, wherein the selection of the second bandwidth comprises identifying, based on the first information, a first bandwidth offset that maps to the first acknowledgement information.

Aspect 28: The method of any of aspects 16 through 27, further comprising: identifying, based on the first information, a slot offset that maps to the first acknowledgement information.

Aspect 29: The method of any of aspects 16 through 28, wherein the first information is output for transmission via downlink control information, a medium access control-control element (MAC-CE), or a radio resource control (RRC) message.

Aspect 30: The method of any of aspects 16 through 29, further comprising: a receiving the first acknowledgement information, and transmitting the first information, the first transmission, and the retransmission, wherein the first apparatus is configured as a network entity.

Aspect 31: A user equipment, comprising: at least one transceiver; a memory comprising instructions; and one or more processors configured to execute the instructions and cause the user equipment to perform a method in accordance with any one or more of aspects 1-14, wherein the at least one transceiver is configured to receive the first information and the first transmission, and transmit the first acknowledgement information.

Aspect 32: A first apparatus configured for communication comprising at least one means for performing any one or more of aspects 1 through 14.

Aspect 33: A non-transitory computer-readable medium storing computer-executable code, comprising code for causing a first apparatus to perform any one or more of aspects 1 through 14.

Aspect 34: A first apparatus, comprising: a memory comprising instructions; and one or more processors configured to execute the instructions and cause the first apparatus to perform a method in accordance with any one or more of aspects 1-14.

Aspect 35: A network entity, comprising: at least one transceiver; a memory comprising instructions; and one or more processors configured to execute the instructions and cause the network entity to perform a method in accordance with any one or more of aspects 16-29, wherein the at least one transceiver is configured to receive the first acknowledgement information, and transmit the first information, the first transmission, and the retransmission.

Aspect 36: A first apparatus configured for communication comprising at least one means for performing any one or more of aspects 16 through 30.

Aspect 37: A non-transitory computer-readable medium storing computer-executable code, comprising code for causing a first apparatus to perform any one or more of aspects 16 through 30.

Aspect 38: A first apparatus, comprising: a memory comprising instructions; and one or more processors configured to execute the instructions and cause the first apparatus to perform a method in accordance with any one or more of aspects 16-29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another—even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may include, for example, ascertaining, resolving, selecting, choosing, establishing, calculating, computing, processing, deriving, investigating, looking up (e.g., looking up in a table, a database or another data structure), and the like. Also, "determining" may include receiving (e.g., receiving information), accessing (e.g., accessing data in a memory), and the like.

One or more of the components, steps, features and/or functions illustrated in FIGS. 1-14 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in FIGS. 1, 2, 3, 8, 10, 11, and 13 may be configured to perform one or more of the methods, features, or steps escribed herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A first apparatus for wireless communication, comprising:

at least one transceiver;

at least one memory configured to store processor executable code; and at least one processor configured to execute the processor-executable code to cause the first apparatus to:

receive, from a second apparatus via the at least one transceiver, first information indicative of at least one reduction in retransmission bandwidth relative to a first initial transmission bandwidth associated with a physical downlink control channel PDCCH) and a second initial transmission bandwidth, different from the first initial transmission bandwidth, associated with a physical downlink shared channel (PDSCH), the at least one reduction in retransmission bandwidth being associated with acknowledgement information;

receive, via the at least one transceiver and the first initial transmission bandwidth associated with the PDCCH, a first PDCCH transmission from the second apparatus;

receive, via the at least one transceiver and the second initial transmission bandwidth associated with the PDSCH, a first PDSCH transmission from the second apparatus;

transmit, to the second apparatus via the at least one transceiver, first acknowledgement information associated with the first PDSCH transmission, the first acknowledgement information comprising a positive acknowledgement (ACK) or a negative acknowledgement (NACK);

select a first retransmission bandwidth associated with the PDCCH and a second retransmission bandwidth, different from the first retransmission bandwidth, associated with the PDSCH, wherein the first retransmission bandwidth is narrower than the first initial transmission bandwidth and the second retransmission bandwidth is narrower than the second initial transmission bandwidth, the selection of the first retransmission bandwidth and the second retransmission bandwidth being associated with the first information indicative of the at least one reduction in retransmission bandwidth and the first acknowledgement information comprising the ACK or NACK;

monitor, via the at least one transceiver and the first retransmission bandwidth, for a second PDCCH transmission associated with the first PDCCH transmission; and monitor, via the at least one transceiver and the second retransmission bandwidth, for a second PDSCH transmission associated with retransmission of the first PDSCH transmission.

2. The first apparatus of claim 1, wherein at least one of: the second initial transmission bandwidth is associated with a first physical downlink shared channel resource allocation; or
the second retransmission bandwidth is associated with a second physical downlink shared channel resource allocation.

3. The first apparatus of claim 1, wherein at least one of: the first initial transmission bandwidth is associated with a first physical downlink control channel search space; or
the first retransmission bandwidth is associated with a second physical downlink control channel search space.

4. The first apparatus of claim 1, wherein:
the first information maps a first bandwidth reduction to a first NACK/ACK ratio;
the first information maps a second bandwidth reduction to a second NACK/ACK ratio;
the first bandwidth reduction is different from the second bandwidth reduction;
the first NACK/ACK ratio is different from the second NACK/ACK ratio; and
the selection of the first retransmission bandwidth or the second retransmission bandwidth comprises a selection of the first bandwidth reduction based on a comparison of the first acknowledgement information with the first NACK/ACK ratio.

5. The first apparatus of claim 4, wherein at least one of:
the first bandwidth reduction is associated with at least one of: a first physical downlink shared channel resource allocation, or a first physical downlink control channel search space; or
the second bandwidth reduction is associated with at least one of: a second physical downlink shared channel resource allocation, or a second physical downlink control channel search space.

6. The first apparatus of claim 4, wherein:
the first bandwidth reduction indicates a first percentage of the first initial transmission bandwidth;
the second bandwidth reduction indicates a second percentage of the first initial transmission bandwidth; and
the first percentage is different from the second percentage.

7. The first apparatus of claim 1, wherein the first acknowledgement information indicates a NACK/ACK ratio associated with the first PDSCH transmission.

8. The first apparatus of claim 1, wherein the first information indicates a location of the first retransmission bandwidth within the first initial transmission bandwidth.

9. The first apparatus of claim 1, wherein the first information indicates a frequency offset of the first retransmission bandwidth.

10. The first apparatus of claim 1, wherein:
the first information indicates a first slot offset between the first PDSCH transmission and the second PDSCH transmission; or
the first information indicates a second slot offset between the second PDSCH transmission and another retransmission of the first PDSCH transmission.

11. The first apparatus of claim 1, wherein the selection of the first retransmission bandwidth comprises an identification, based on the first information, of a first bandwidth reduction that maps to the first acknowledgement information.

12. The first apparatus of claim 1, wherein the selection of the first retransmission bandwidth comprises an identification, based on the first information, of a first bandwidth offset that maps to the first acknowledgement information.

13. The first apparatus of claim 1, wherein the processing system is further configured to:
identify, based on the first information, a slot offset that maps to the first acknowledgement information.

14. The first apparatus of claim 1, wherein the first information is received via downlink control information, a medium access control-control element (MAC-CE), or a radio resource control (RRC) message.

15. The first apparatus of claim 1, wherein the first apparatus is configured to operate as a user equipment.

16. A first apparatus for wireless communication, comprising:
at least one transceiver;
at least one memory configured to store processor executable code; and
at least one processor configured to execute the processor-executable code to cause the first apparatus to:
transmit, to a second apparatus via the at least one transceiver, first information indicative of at least one reduction in retransmission bandwidth relative to a first initial transmission bandwidth associated with a physical downlink control channel (PDCCH) and a second initial transmission bandwidth, different from the first initial transmission bandwidth, associated with a physical downlink shared channel (PDSCH), the at least one reduction in retransmission bandwidth being associated with acknowledgement information;

transmit, to the second apparatus via the at least one transceiver and the first initial transmission bandwidth associated with the PDCCH, a first PDCCH transmission;

transmit, to the second apparatus via the at least one transceiver and the second initial transmission bandwidth associated with the PDSCH, a first PDSCH transmission;

receive, from the second apparatus via the at least one transceiver, first acknowledgement information associated with the first PDSCH transmission, the first acknowledgement information comprising a positive acknowledgement (ACK) or a negative acknowledgement (NACK);

select a first retransmission bandwidth associated with the PDCCH and a second retransmission bandwidth, different from the first retransmission bandwidth, associated with the PDSCH, wherein the first retransmission bandwidth is narrower than the first initial transmission bandwidth and the second retransmission bandwidth is narrower than the second initial transmission bandwidth, the selection of the second-first retransmission bandwidth and the second retransmission bandwidth being associated with the first information indicative of the at least one reduction in retransmission bandwidth and the first acknowledgement information comprising the ACK or NACK;

transmit, via the at least one transceiver and the first retransmission bandwidth, a second PDCCH transmission associated with the first PDCCH transmission; and transmit, via the at least one transceiver and the second retransmission bandwidth, a second PDSCH transmission associated with retransmission of the first PDSCH transmission.

17. The first apparatus of claim 16, wherein at least one of:

the second initial transmission bandwidth is associated with a first physical downlink shared channel resource allocation; or the second retransmission bandwidth is associated with a second physical downlink shared channel resource allocation.

18. The first apparatus of claim 16, wherein at least one of:

the first initial transmission bandwidth is associated with a first physical downlink control channel search space; or the first retransmission bandwidth is associated with a second physical downlink control channel search space.

19. The first apparatus of claim 16, wherein:

the first information maps a first bandwidth reduction to a first NACK/ACK ratio;

the first information maps a second bandwidth reduction to a second NACK/ACK ratio;

the first bandwidth reduction is different from the second bandwidth reduction;

the first NACK/ACK ratio is different from the second NACK/ACK ratio; and the selection of the first retransmission bandwidth or the second retransmission bandwidth comprises a selection of the first bandwidth reduction based on a comparison of the first acknowledgement information with the first NACK/ACK ratio.

20. The first apparatus of claim 19, wherein at least one of:

the first bandwidth reduction is associated with at least one of: a first physical downlink shared channel resource allocation, or a first physical downlink control channel search space; or the second bandwidth reduction is associated with at least one of: a second physical downlink shared channel resource allocation, or a second physical downlink control channel search space.

21. The first apparatus of claim 19, wherein:

the first bandwidth reduction indicates a first percentage of the first initial transmission bandwidth;

the second bandwidth reduction indicates a second percentage of the first initial transmission bandwidth; and the first percentage is different from the second percentage.

22. The first apparatus of claim 16, wherein the first acknowledgement information indicates a NACK/ACK ratio associated with the first PDSCH transmission.

23. The first apparatus of claim 16, wherein the first information indicates a location of the first retransmission bandwidth within the first initial transmission bandwidth.

24. The first apparatus of claim 16, wherein the first information indicates a frequency offset of the first retransmission bandwidth.

25. The first apparatus of claim 16, wherein:

the first information indicates a first slot offset between the first PDSCH transmission and the second PDSCH transmission; or the first information indicates a second slot offset between the second PDSCH transmission and another retransmission of the first PDSCH transmission.

26. The first apparatus of claim 16, wherein the selection of the first retransmission bandwidth comprises an identification, based on the first information, of a first bandwidth reduction that maps to the first acknowledgement information.

27. The first apparatus of claim 16, wherein the selection of the first retransmission bandwidth comprises an identification, based on the first information, of a first bandwidth offset that maps to the first acknowledgement information.

28. The first apparatus of claim 16, wherein the processing system is further configured to:

include, in the first information, a slot offset that maps to the first acknowledgement information.

29. The first apparatus of claim 16, wherein the first information is transmitted via downlink control information, a medium access control-control element (MAC-CE), or a radio resource control (RRC) message.

30. The first apparatus of claim 16 wherein the first apparatus is configured to operate as a network entity.

* * * * *